(12) United States Patent
Yushin et al.

(10) Patent No.: US 12,166,197 B2
(45) Date of Patent: Dec. 10, 2024

(54) ANODE ELECTRODE COMPOSITION OF LI-ION BATTERY CELL

(71) Applicant: Sila Nanotechnologies, Inc., Alameda, CA (US)

(72) Inventors: Gleb Yushin, Atlanta, GA (US); Laura Gerber, Oakland, CA (US); Adam Kajdos, Alameda, CA (US); Justin Yen, Alameda, CA (US); Justin Doane, Alameda, CA (US); Jens Steiger, Alameda, CA (US)

(73) Assignee: Sila Nanotechnologies, Inc., Alameda, CA (US)

(*) Notice: Subject to any disclaimer, the term of this patent is extended or adjusted under 35 U.S.C. 154(b) by 0 days.

(21) Appl. No.: 18/510,044

(22) Filed: Nov. 15, 2023

(65) Prior Publication Data

US 2024/0154092 A1 May 9, 2024

Related U.S. Application Data

(63) Continuation of application No. 18/154,301, filed on Jan. 13, 2023, now Pat. No. 11,837,712, which is a (Continued)

(51) Int. Cl.
*H01M 4/134* (2010.01)
*H01M 4/38* (2006.01)
*H01M 4/62* (2006.01)
*H01M 4/66* (2006.01)
*H01M 4/74* (2006.01)
(Continued)

(52) U.S. Cl.
CPC ........... *H01M 4/134* (2013.01); *H01M 4/386* (2013.01); *H01M 4/622* (2013.01); *H01M 4/625* (2013.01); *H01M 4/661* (2013.01); *H01M 4/742* (2013.01); *H01M 10/052* (2013.01); *H01M 10/0525* (2013.01); *H01M 2004/021* (2013.01);
(Continued)

(58) Field of Classification Search
CPC ...... H01M 4/623; H01M 4/662; H01M 4/131; H01M 4/134; H01M 4/386; H01M 4/622; H01M 4/625; H01M 2004/021; H01M 2004/027; H01M 10/0525
See application file for complete search history.

(56) References Cited

U.S. PATENT DOCUMENTS

2016/0149207 A1* 5/2016 Lahlouh ............... H01M 4/602
429/213

* cited by examiner

*Primary Examiner* — Christopher P Domone
*Assistant Examiner* — Kimberly Wyluda
(74) *Attorney, Agent, or Firm* — Muncy, Geissler, Olds & Lowe, P.C.; Daniel Podhajny

(57) ABSTRACT

In an embodiment, a Li-ion battery cell comprises an anode electrode with an electrode coating that (1) comprises Si-comprising active material particles, (2) exhibits an areal capacity loading in the range of about 3 mAh/cm² to about 12 mAh/cm², (3) exhibits a volumetric capacity in the range from about 600 mAh/cc to about 1800 mAh/cc in a charged state of the cell, (4) comprises conductive additive material particles, and (5) comprises a polymer binder that is configured to bind the Si-comprising active material particles and the conductive additive material particles together to stabilize the anode electrode against volume expansion during the one or more charge-discharge cycles of the battery cell while maintaining the electrical connection between the metal current collector and the Si-comprising active material particles.

32 Claims, 7 Drawing Sheets

Related U.S. Application Data continuation of application No. 16/164,704, filed on Oct. 18, 2018, now Pat. No. 11,581,523.

(60) Provisional application No. 62/574,654, filed on Oct. 19, 2017.

(51) Int. Cl.
  *H01M 10/052* (2010.01)
  *H01M 10/0525* (2010.01)
  *H01M 4/02* (2006.01)
  *H01M 4/131* (2010.01)

(52) U.S. Cl.
  CPC ...... *H01M 2004/027* (2013.01); *H01M 4/131* (2013.01); *H01M 4/623* (2013.01); *H01M 4/662* (2013.01)

ANODE ELECTRODE COMPOSITION OF LI-ION BATTERY CELL

CROSS-REFERENCE TO RELATED APPLICATIONS

The present application for patent is a Continuation of U.S. Non-Provisional application Ser. No. 18/154,301, entitled "ANODE ELECTRODE COMPOSITION OF LI-ION BATTERY CELL," filed Jan. 13, 2023, which is a Continuation of U.S. Non-Provisional application Ser. No. 16/164,704, entitled "ANODE ELECTRODE COMPOSITION OF LI-ION BATTERY CELL," filed Oct. 18, 2018, which in turn claims the benefit of U.S. Provisional Application No. 62/574,654, entitled "Improvement in High-Capacity Battery Electrodes with Binders and Construction," filed Oct. 19, 2017, each of which is expressly incorporated herein by reference in its entirety.

BACKGROUND

Field

The present disclosure relates generally to energy storage devices, and more particularly to battery technology and the like.

Background

Owing in part to their relatively high energy densities, relatively high specific energy, light weight, and potential for long lifetimes, advanced rechargeable batteries are desirable for a wide range of consumer electronics, electric vehicle, grid storage and other important applications.

However, despite the increasing commercial prevalence of batteries, further development of these batteries is needed, particularly for potential applications in low- or zero-emission, hybrid-electrical or fully-electrical vehicles, consumer electronics, energy-efficient cargo ships and locomotives, aerospace applications, and power grids. In particular, further improvements are desired for various rechargeable batteries, such as rechargeable metal and metal-ion batteries (such as rechargeable Li and Li-ion batteries, rechargeable Na and Na-ion batteries, rechargeable K and K-ion batteries, rechargeable Mg and Mg-ion batteries, etc.), rechargeable aqueous batteries, rechargeable alkaline batteries, rechargeable metal hydride batteries, and lead acid batteries, to name a few.

A broad range of active (charge-storing) materials, a broad range of polymer binders, a broad range of conductive additives and various mixing recipes may be utilized in the construction of battery electrodes. However, for improved electrode performance (e.g., low and stable resistance, high cycling stability, high rate capability, etc.), the optimal choice of binders, additives, and mixing protocols needs to be discovered for specific types, properties and specific sizes of active particles. In many cases, these choices are not trivial and can be counter-intuitive.

In many different types of rechargeable batteries, charge-storing materials may be produced as high-capacity (nano) composite powders, which exhibit moderately high volume changes (e.g., 8-180 vol. %) during the first charge-discharge cycle and moderate volume changes (e.g., 5-50 vol. %) during the subsequent charge-discharge cycles. A subset of such charge-storing particles includes particles with an average size in the range from around 0.2 to around 20 microns (preferably, from around 0.2 to around 10 microns). Such a class of charge-storing particles offers great promise for scalable manufacturing and achieving high cell-level energy density and other performance characteristics. Unfortunately, such particles are relatively new and their formation into electrodes using conventional binders, conductive additives, and mixing protocols may result in poor performance characteristics and limited cycle stability. The performance often becomes particularly poor for certain applications when the electrode capacity loading becomes moderate (e.g., 2-4 $mAh/cm^2$) or even more so when it becomes high (e.g., 4-10 $mAh/cm^2$). Higher capacity loading, however, is advantageous for increasing cell energy density and reducing cell manufacturing costs.

Examples of materials that exhibit moderately high volume changes (e.g., 8-180 vol. %) during the first charge-discharge cycle and moderate volume changes (e.g., 5-50 vol. %) during the subsequent charge-discharge cycles include (nano)composites comprising so-called conversion-type (which includes both so-called chemical transformation and so-called "true conversion" sub-classes) and so-called alloying-type active electrode materials. In the case of metal-ion batteries (such as Li-ion batteries), examples of such conversion-type active electrode materials include, but are not limited to, metal fluorides (such as lithium fluoride, iron fluoride, cupper fluoride, bismuth fluorides, their mixtures and alloys, etc.), metal chlorides, metal iodides, metal chalcogenides (such as sulfides, including lithium sulfide and other metal sulfides), sulfur, metal oxides (including lithium oxide, silicon oxides, tin oxide, antimony oxide and other metal oxides), metal nitrides, metal phosphides (including lithium phosphide), metal hydrides, and others. In the case of metal-ion batteries (such as Li-ion batteries), examples of such alloying-type electrodes include, but are not limited to, silicon, germanium, antimony, aluminum, magnesium, zinc, gallium, arsenic, phosphorous, silver, cadmium, indium, tin, lead, bismuth, their alloys, mixtures and others. These materials may offer higher gravimetric and volumetric capacity than so-called intercalation-type electrodes used in certain commercial Li-ion batteries. Conversion-type electrodes are also commonly used in various aqueous batteries, such as alkaline batteries, metal hydride batteries, lead acid batteries, etc. These include, but are not limited to, various metals (such as iron, zinc, cadmium, lead, indium, etc.), metal oxides, metal hydroxides, metal oxyhydroxides, and metal hydrides, to name a few.

In addition to the needed improvement(s) in electrode formulations, an improvement in separators is also needed for better cell-level design.

Accordingly, there remains a need for improved batteries, components, and other related materials and manufacturing processes.

SUMMARY

Embodiments disclosed herein address the above stated needs by providing improved batteries, components, and other related materials and manufacturing processes.

As an example, a Li-ion battery cell, comprises anode and cathode electrodes, an electrolyte ionically coupling the anode electrode and the cathode electrode, and a separator electrically separating the anode electrode and the cathode electrode, wherein the anode electrode comprises a metal current collector and an electrode coating, wherein the electrode coating: (1) comprises Si-comprising active material particles that exhibit an average particle size in the range from about 0.2 microns to about 10 microns and exhibit a volume expansion in the range of about 8 vol. % to about 180 vol. % during one or more charge-discharge cycles of the Li-ion battery cell, (2) exhibits an areal capacity loading in the range of about 3 mAh/cm$^2$ to about 12 mAh/cm$^2$, (3) exhibits a volumetric capacity in the range from about 600 mAh/cc to about 1800 mAh/cc in a charged state of the Li-ion battery cell, (4) comprises conductive additive material particles, and (5) comprises a polymer binder that is configured to bind the Si-comprising active material particles and the conductive additive material particles together to stabilize the anode electrode against the volume expansion during the one or more charge-discharge cycles of the Li-ion battery cell while maintaining an electrical connection between the metal current collector and the Si-comprising active material particles.

BRIEF DESCRIPTION OF THE DRAWINGS

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

DETAILED DESCRIPTION

Figure 1:
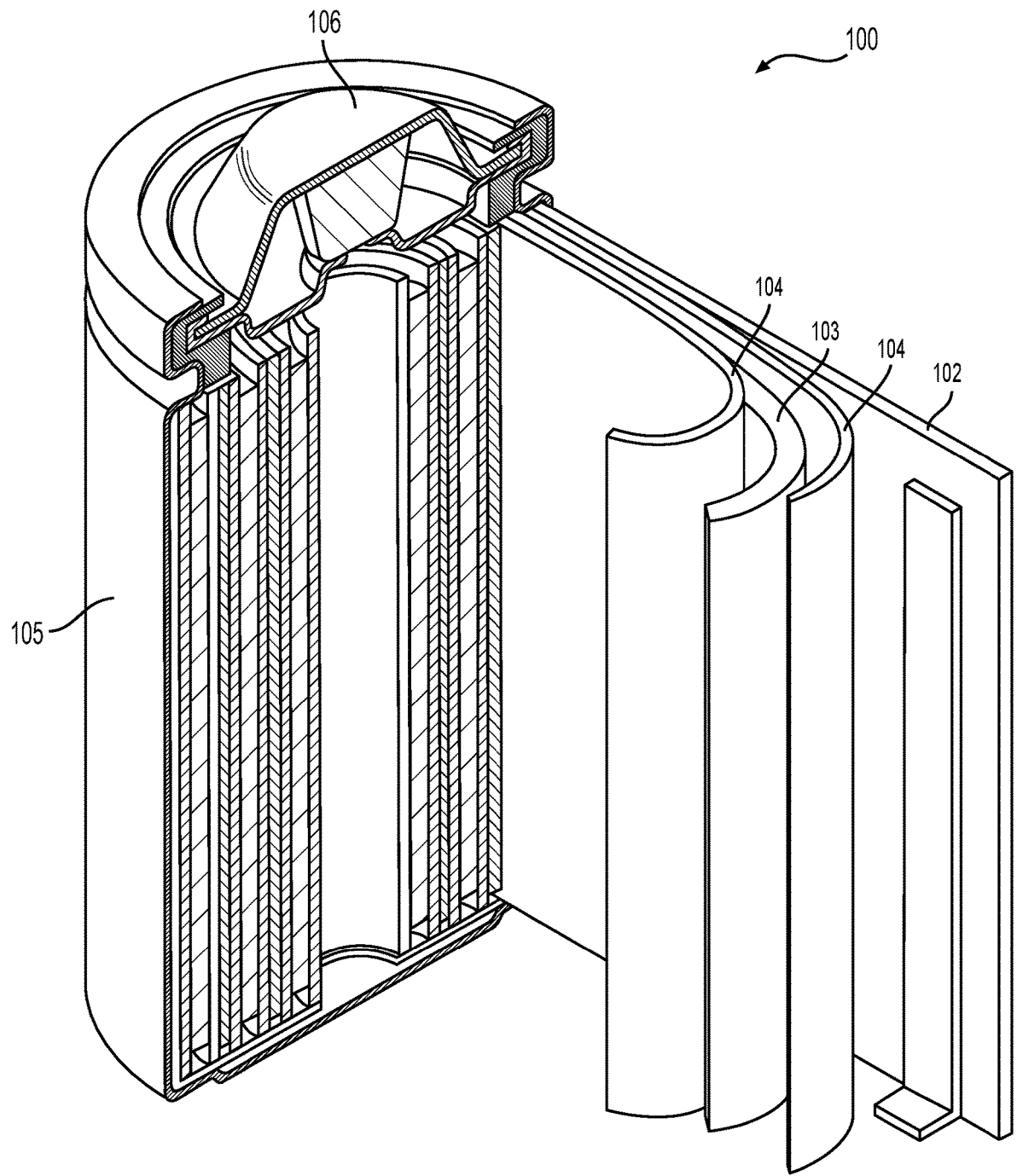
FIG. 1 illustrates an example (e.g., Li-ion) battery in which the components, materials, methods, and other techniques described herein, or combinations thereof, may be applied according to various embodiments.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details. Further, the terminology of "at least partially" is intended for interpretation as "partially, substantially or completely".

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range.

While the description below may describe certain examples in the context of Li and Li-ion batteries (for brevity and convenience, and because of the current popularity of Li technology), it will be appreciated that various aspects may be applicable to other rechargeable and primary batteries (such as Na-ion, Mg-ion, K-ion, Ca-ion, Zn-ion, Cu-ion and other metal-ion batteries, alkaline batteries, etc.). Further, while the description below may also describe certain examples of the material formulations in a Li-free state (for example, as in silicon-comprising nanocomposite anodes), it will be appreciated that various aspects may be applicable to Li-containing electrodes (for example, partially or fully lithiated Si anodes, partially or fully lithiated silicon oxide (SiO$_x$), partially or fully lithiated metal fluorides (mixture of LiF and metals such as Cu, Fe, Cu—Fe alloys, etc.), Li$_2$S, partially or fully lithiated carbon-containing materials, partially or fully lithiated polymer-containing materials, various partially or fully lithiated composites, etc.).

Further, while the description below may describe certain examples in the context of some specific alloying-type and conversion-type chemistries of anode and cathode active materials for Li-ion batteries (such as silicon-comprising anodes or metal fluoride-comprising or lithium sulfide-comprising cathodes), it will be appreciated that various aspects may be applicable to other chemistries for Li-ion batteries (other conversion-type and alloying-type electrodes as well as various intercalation-type electrodes) as well as to other battery chemistries. In the case of metal-ion batteries (such as Li-ion batteries), examples of other suitable conversion-type electrodes include, but are not limited to, metal chlorides, metal iodides, sulfur, metal sulfides, selenium, metal selenides, metal oxides, metal nitrides, metal phosphides, metal hydrides, phosphorous, tin, antimony, aluminum, lead, magnesium, their various composites and mixtures, and many others. Various aspects may also be applicable to electrodes comprising both intercalation-type and conversion-type active materials or intercalation-type and alloying-type active materials or intercalation-type and conversion-type and alloying-type active materials or conversion-type and alloying-type active materials.

During battery (such as a Li-ion battery) operation, conversion materials change (convert) from one crystal structure to another (hence the name "conversion"-type). During (e.g., Li-ion) battery operation, Li ions are inserted into alloying type materials forming lithium alloys (hence the name "alloying"-type). Sometimes, "alloying"-type electrode materials are considered to be a sub-class of "conversion"-type electrode materials.

While the description below may describe certain examples in the context of metal-ion batteries, other conversion-type electrodes that may benefit from various aspects of the present disclosure include various chemistries used in a broad range of aqueous batteries, such as alkaline batteries, metal hydride batteries, lead acid batteries, other types of aqueous batteries (e.g., with neutral, acidic or basic electrolytes), etc. These include, but are not limited to, various metals (such as iron, zinc, cadmium, lead, indium, etc.), metal oxides, metal hydrides, metal sulfides, metal hydroxides, metal oxyhydroxides, metal hydrides, their various composites, mixtures and others.

FIG. 1 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (not shown) impregnating the separator 104, a battery case 105, and a sealing member 106 sealing the battery case 105.

Either liquid or solid electrolytes may be used for the designs herein. Electrolytes for certain Li- or Na-based batteries may comprise a single Li or Na salt (such as $LiPF_6$ for Li-ion batteries and $NaPF_6$ or $NaClO_4$ salts for Na-ion batteries) in a mixture of organic solvents (such as a mixture of carbonates or other solvent(s)). Other examples of common organic solvents in electrolytes include nitriles, esters, sulfones, sulfoxides, phosphorous-based solvents, silicon-based solvents, ethers, and others. Such solvents may be modified (e.g., be sulfonated or fluorinated). The electrolytes may also comprise ionic liquids (in some designs, neutral ionic liquids; in other designs, acidic or basic ionic liquids). The electrolytes may also comprise mixtures of various salts (e.g., mixtures of several Li salts or mixtures of Li and non-Li salts for rechargeable Li and Li-ion batteries). These salts may be inorganic or organic.

In the case of aqueous Li-ion (or aqueous Na-ion, K-ion, Ca-ion, etc.) batteries, electrolytes may include a solution (e.g., aqueous solution or mixed aqueous-organic solution) of inorganic Li (or Na, K, Ca, etc.) salt(s) (such as $Li_2SO_4$, $LiNO_3$, $LiCl$, $LiBr$, $Li_3PO_4$, $H_2LiO_4P$, $C_2F_3LiO_2$, $C_2F_3LiO_3S$, $Na_2O_3Se$, $Na_2SO_4$, $Na_2O_7Si_3$, $Na_3O_9P_3$, $C_2F_3NaO_2$ etc.). These electrolytes may also comprise solutions of organic Li (or Na, K, Ca, etc.) salts, such as (listed with respect to Li for brevity) metal salts of carboxylic acids (such as $HCOOLi$, $CH_3COOLi$, $CH_3CH_2COOLi$, $CH_3(CH_2)_2COOLi$, $CH_3(CH_2)_3COOLi$, $CH_3(CH_2)_4COOLi$, $CH_3(CH_2)_5COOLi$, $CH_3(CH_2)_6COOLi$, $CH_3(CH_2)_7COOLi$, $CH_3(CH_2)_8COOLi$, $CH_3(CH_2)_9COOLi$, $CH_3(CH_2)_{10}COOLi$, $CH_3(CH_2)_{11}COOLi$, $CH_3(CH_2)_{12}COOLi$, $CH_3(CH_2)_{13}COOLi$, $CH_3(CH_2)_{14}COOLi$, $CH_3(CH_2)_{15}COOLi$, $CH_3(CH_2)_{16}COOLi$, $CH_3(CH_2)_{17}COOLi$, $CH_3(CH_2)_{18}COOLi$ and others with the formula $CH_3(CH_2)_xCOOLi$, where x ranges up to 50); metal salts of sulfonic acids (e.g., $RS(=O)_2$—$OH$, where R is a metal salt of an organic radical, such as a $CH_3SO_3Li$, $CH_3CH_2SO_3Li$, $C_6H_5SO_3Li$, $CH_3C_6H_4SO_3Li$, $CF_3SO_3Li$, $[CH_2CH(C_6H_4)SO_3Li]n$ and others) and various other organometallic reagents (such as various organolithium reagents), to name a few. Such solutions may also comprise mixtures of inorganic and organic salts, various other salt mixtures (for example, a mixture of a Li salt and a salt of non-Li metals and semimetals), and, in some cases, hydroxide(s) (such as $LiOH$, $NaOH$, $KOH$, $Ca(OH)_2$, etc.), and, in some cases, acids (including organic acids). In some designs, such aqueous electrolytes may also comprise neutral or acidic or basic ionic liquids (from approximately 0.00001 wt. % to approximately 40 wt. % relative to the total weight of electrolyte). In some designs, such "aqueous" (or water containing) electrolytes may also comprise organic solvents (from approximately 0.00001 wt. % to approximately 40 wt. % relative to the total weight of electrolyte), in addition to water. Illustrative examples of suitable organic solvents may include carbonates (e.g., propylene carbonate, ethylene carbonate, diethyl carbonate, dimethyl carbonate, ethyl methyl carbonate, fluoroethylene carbonate, vinylene carbonate, and others), various nitriles (e.g., acetonitrile, etc.), various esters, various sulfones (e.g., propane sulfone, etc.), various sultones, various sulfoxides, various phosphorous-based solvents, various silicon-based solvents, various ethers, and others.

The most common salt used in a Li-ion battery electrolyte, for example, is $LiPF_6$, while less common salts include lithium tetrafluoroborate ($LiBF_4$), lithium perchlorate ($LiClO_4$), lithium bis(oxalato)borate ($LiB(C_2O_4)_2$, lithium difluoro(oxalate)borate ($LiBF_2(C_2O_4)$), various lithium imides (such as $SO_2FN^-(Li^+)SO_2F$, $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$, and others), and others. Electrolytes for Mg-ion, K-ion, Ca-ion, and Al-ion batteries are often more exotic as these batteries are in earlier stages of development. They may comprise different salts and solvents (in some cases, ionic liquids may replace organic solvents for certain applications).

Some electrolytes in aqueous batteries (such as alkaline batteries, including nickel-metal hydride batteries) may comprise an alkaline solution (for example, a mixture of KOH and LiOH solutions). Some electrolytes in aqueous batteries (such as lead acid batteries) may comprise an acidic aqueous solution (for example, $H_2SO_4$ or HCl aqueous solution). Some electrolytes in aqueous batteries may comprise an organic solvent as an additive. Some electrolytes in aqueous batteries may comprise two or more organic solvent(s) or ionic liquid(s) as additive(s) or substantial components of the electrolyte.

Certain electrodes utilized in Li-ion batteries may be produced by (i) formation of a slurry comprising active materials, conductive additives, binder solutions and, in some cases, surfactant or other functional additives; (ii) casting the slurry onto a metal foil (e.g., Cu foil for certain anodes and Al foil for certain cathodes); and (iii) drying the casted electrodes to completely evaporate the solvent.

Certain conventional cathode materials utilized in Li-ion batteries are of an intercalation-type. Metal ions are intercalated into and occupy the interstitial positions of such materials during the charge or discharge of a battery. Such cathodes experience very small volume changes when used in electrodes. Such conventional cathode materials (e.g., lithium cobalt oxide, lithium nickel manganese cobalt oxide, lithium nickel cobalt aluminum oxide, lithium iron phosphate, lithium manganese oxide, etc.) also typically exhibit relatively high density (e.g., about 3.8-6 g/cm$^3$, at the active material level) and are relatively easy to mix in slurries. Polyvinylidene fluoride, or polyvinylidene difluoride (PVDF), is a common binder used in these electrodes. Carbon black is a common conductive additive used in these electrodes. However, such cathodes exhibit relatively small gravimetric and volumetric capacities (e.g., less than around 220 mAh/g and less than around 700-800 mAh/cm$^3$, respectively).

Conversion-type cathode materials for rechargeable Li-ion or Li batteries may offer higher energy density, higher specific energy, or higher specific or volumetric capacities compared to intercalation-type cathode materials.

For example, fluoride-based cathodes may offer outstanding technological potential due to their very high capacities, in some cases exceeding 300 mAh/g (greater than 1200 mAh/cm$^3$ at the electrode level). For example, in a Li-free state, $FeF_3$ offers a theoretical specific capacity of 712 mAh/g; $FeF_2$ offers a theoretical specific capacity of 571 mAh/g; $MnF_3$ offers a theoretical specific capacity of 719 mAh/g; $CuF_2$ offers a theoretical specific capacity of 528 mAh/g; $NiF_2$ offers a theoretical specific capacity of 554 mAh/g; $PbF_2$ offers a theoretical specific capacity of 219 mAh/g; $BiF_3$ offers a theoretical specific capacity of 302 mAh/g; $BiF_5$ offers a theoretical specific capacity of 441 mAh/g; $SnF_2$ offers a theoretical specific capacity of 342 mAh/g; $SnF_4$ offers a theoretical specific capacity of 551 mAh/g; $SbF_3$ offers a theoretical specific capacity of 450 mAh/g; $SbF_5$ offers a theoretical specific capacity of 618 mAh/g; $CdF_2$ offers a theoretical specific capacity of 356 mAh/g; and $ZnF_2$ offers a theoretical specific capacity of 519 mAh/g. Mixtures (for example, in the form of alloys) of fluorides may offer a theoretical capacity approximately calculated according to the rule of mixtures. The use of mixed metal fluorides may sometimes be advantageous (e.g., may offer higher rates, lower resistance, higher practical capacity, or longer stability). In a fully lithiated state, metal fluorides covert to a composite comprising a mixture of metal and LiF clusters (or nanoparticles). Examples of the overall reversible reactions of the conversion-type metal fluoride cathodes may include $2Li^++CuF_2 \leftrightarrow 2LiF+Cu$ for $CuF_2$-based cathodes or $3Li^++FeF_3 \leftrightarrow 3LiF+Fe$ for $FeF_3$-based cathodes). It will be appreciated that metal fluoride-based cathodes may be prepared in both Li-free or partially lithiated or fully lithiated states.

Another example of a promising conversion-type cathode (or, in some cases, anode) material is sulfur (S) (in a Li-free state) or lithium sulfide ($Li_2S$, in a fully lithiated state). In order to reduce dissolution of active material during cycling, to improve electrical conductivity, or to improve mechanical stability of $S/Li_2S$ electrodes, one may utilize formation of porous S, $Li_2S$, porous S—C composites, $Li_2S$—C composites, porous S-polymer composites, or other composites comprising S or $Li_2S$, or both.

Unfortunately, many conventional conversion-type electrodes used in Li-ion batteries suffer from performance limitations. Formation of (nano)composites may, at least partially, overcome such limitations. For example, (nano)composites may offer reduced voltage hysteresis, improved capacity utilization, improved rate performance, improved mechanical and sometimes improved electrochemical stability, reduced volume changes, and/or other positive attributes. Examples of such composite cathode materials include, but are not limited to, LiF—Cu—Fe—C nanocomposites, $FeF_2$—C nanocomposites, $FeF_3$—C nanocomposites, $CuF_2$—C nanocomposites, LiF—Cu—C nanocomposites, LiF—Cu—C-polymer nanocomposites, LiF—Cu—C-metal oxide nanocomposites, LiF—Cu—C-metal oxyfluoride nanocomposites, LiF—Cu—Fe—C-metal oxide nanocomposites, LiF—Cu—Fe—C-metal oxyfluoride nanocomposites, LiF—Cu-metal-polymer nanocomposites, LiF—Cu-metal-carbon-polymer nanocomposites, LiF—Cu—Fe—C-metal fluoride nanocomposites, LiF—Cu—Fe—C-metal fluoride-polymer nanocomposites, and many other porous or nonporous (dense) nanocomposites comprising LiF, $FeF_3$, $FeF_2$, $MnF_3$, $CuF_2$, $NiF_2$, $PbF_2$, $BiF_3$, $BiF_5$, $CoF_2$, $SnF_2$, $SnF_4$, $SbF_3$, $SbF_5$, $CdF_2$, $ZrF_4$, or $ZnF_2$, or other metal fluorides or their mixtures and possibly comprising metals, oxides of metals or semimetals, metal oxyfluorides, phosphides, sulfides, phosphates, polymers, carbon, etc. In some examples, metal fluoride nanoparticles may be infiltrated into the pores of porous carbon (for example, into the pores of activated carbon particles) to form these metal-fluoride-C nanocomposites, which may be enclosed in shells or coatings of various compositions (various metal or semimetal oxides, various oxy-fluorides, fluorides, various sulfides, various phosphides, various phosphates, various polymers (including ionically or electronically conductive polymers), carbon (including graphitic or turbostratic carbon or graphene, etc.), various metals, their various mixtures, etc.). Examples of suitable metals of these various metal, metal oxide, metal sulfide, metal fluoride, metal oxi-fluoride, metal phosphides, metal phosphates, their various mixtures and other compositions of the composites may include (in the bulk or in the shell or in other parts of the composites), but are not limited to: Li, Na, Mg, K, Ca, Cs, Ca, Sc, Ti, V, Cr, Mn, Fe, Co, Ni, Cu, Zn, Al, Si, Ga, Sb, Sn, Bi, V, Hf, Ta, W, La, and Y.

In particular, high-capacity (nano)composite cathode powders, which exhibit moderately high volume changes (e.g., about 8-160 vol. %) during the first charge-discharge cycle, and moderate volume changes (e.g., about 4-50 vol. %) during the subsequent charge-discharge cycles. In an example, the high-capacity (nano)composite cathode powders may have an average size (e.g., a diameter, in the case of spherical particles) in the range from around 0.2 to around 20 microns, which may be particularly attractive for battery applications in terms of manufacturability and performance characteristics. Furthermore, a near-spherical (spheroidal) shape of the composite particles may additionally be very attractive for optimizing rate performance and volumetric capacity of the electrodes. In spite of some improvements that may be achieved with the formation and utilization of such conversion-type nanocomposite cathode materials, however, additional improvements in cell performance characteristics may be achieved with the improved composition and preparation of electrodes, beyond what is known or shown by the conventional state-of-the art. The relatively low density of such composite cathode materials (e.g., about 1-3.8 g/cc) may make uniform slurry mixing, coating deposition, and calendaring (electrode densification) more challenging and require special methodologies for optimal performance. In addition, such nanocomposites may be coated with a carbon outer layer, which is less polar compared to conventional intercalation-type cathodes and thus may make such nanocomposite particles more difficult to disperse, particularly in polar solvents. Overall, producing stable electrodes using such composites materials at medium (e.g., about 2-4 mAh/cm$^2$) or high (e.g., about 4-12 mAh/cm$^2$) areal loadings is typically very challenging.

Certain conventional anode materials utilized in Li-ion batteries are also of an intercalation-type. Metal ions are intercalated into and occupy the interstitial positions of such materials during the charge or discharge of a battery. Such anodes experience very small volume changes when used in electrodes. Polyvinylidene fluoride, or polyvinylidene difluoride (PVDF), and carboxymethyl cellulose (CMC) are two common binders used in these electrodes. Carbon black is a common conductive additive used in these electrodes. However, such anodes exhibit relatively small gravimetric and volumetric capacities (e.g., typically less than 375 mAh/g rechargeable specific capacity in the case of graphite- or hard carbon-based anodes and 300-600 mAh/cm$^3$ rechargeable volumetric capacity; typically less than around 170-240 mAh/g and 300-450 mAh/cm$^3$ for lithium titanate (LTO) and other mixed metal oxides intercalation-type anodes).

Alloying-type anode materials for use in Li-ion batteries offer higher gravimetric and volumetric capacities compared to intercalation-type anodes for certain applications. For example, silicon (Si) offers approximately 10 times higher gravimetric capacity and approximately 3 times higher volumetric capacity compared to an intercalation-type graphite (or graphite-like) anode. However, Si suffers from significant volume expansion during Li insertion (e.g., up to approximately 300 vol. %) and thus may induce thickness changes and mechanical failure of Si-comprising anodes. In addition, Si (and some Li—Si alloy compounds that may form during lithiation of Si) suffer from relatively low electrical conductivity and relatively low ionic (Li-ion) conductivity. Electronic and ionic conductivity of Si is lower than that of graphite. Formation of (nano)composite Si-comprising particles (including, but not limited to various Si—C composites, various Si-metal composites, various Si-polymer composites, various Si-ceramic composites, various Si—C-polymer composites, various Si—C-metal-polymer composites, various Si—C-metal oxide-polymer, various Si—C—O-metal-polymer or other types of porous composites comprising nanostructured Si or nanostructured or nano-sized Si particles of various shapes and forms, fully or partially oxidized Si particles of various shapes, size and forms, fully or partially lithiated Si, etc.) may reduce volume changes during Li-ion insertion and extraction, which, in turn, may lead to better cycle stability in rechargeable Li-ion cells.

In case of Si-comprising (nano)composite anode powders, in some designs it may be particularly useful for the battery designs to use those with the specific capacity in the range from about 500 mAh/g to about 3000 mAh/g. In some designs, the specific capacity of such powders may range from about 600 mAh/g to about 2200 mAh/g in a de-lithiated state of a Li-ion battery operation. In some designs, a combination of graphite or graphite-like carbon active material particles with Si-comprising particles (including various silicon-based composites, silicon oxides, silicon nitrides, silicon phosphides, silicon hydrides, silicon alloys, etc., which may in some designs be coated with a conductive carbon layer or comprise conductive carbon in their composition and which may in some designs comprise polymer in their composition or comprise pores in their composition, etc.) may be used in the anode coating layer. In some designs, Si-comprising particles may experience from about 8 vol. % to about 180 vol. % during one or more charge-discharge cycles of the battery operation. In some designs, Si-comprising particles may exhibit average size in the range from about 50 nm to about 20 micron (in some designs, from about 0.2 to about 10 micron). In some designs, Si-comprising anode coatings may be at least partially pre-lithiated (prior to final Li-ion battery cell assembling) to compensate for the first cycle losses and/or to provide other benefits. In either case of Si-comprising anodes, the anode coating layer may advantageously exhibit volumetric capacity (e.g., in the lithiated state (charged state of the cell) and the resulting expansion during the initial or several (e.g., about 1-10) initial charges) in the range from about 600 mAh/cc to about 1800 mAh/cc (in some designs, from about 700 mAh/cc to about 1400 mAh/cc) in a charged state of the Li-ion battery cell. One or more embodiments of the present disclose are directed to routes to improve performance of such electrodes in cells.

In addition to Si-comprising nanocomposite anodes, other examples of such nanocomposite anodes comprising alloying-type or conversion-type active materials include, but are not limited to, those that comprise germanium, antimony, aluminum, magnesium, zinc, gallium, arsenic, phosphorous, silver, cadmium, indium, tin, lead, bismuth, their various combinations, their various doped compounds, their alloys, and others.

In addition to (nano)composite anodes comprising alloying-type active materials, other interesting types of high capacity (nano)composite anodes may comprise metal oxides (including silicon oxide, lithium oxide, etc.), metal nitrides, metal phosphides (including lithium phosphide), metal hydrides, and others.

In particular, high-capacity (nano)composite anode powders, which exhibit moderately high volume changes (e.g., about 8-180 vol. %) during the first charge-discharge cycle, moderate volume changes (e.g., about 4-50 vol. %) during the subsequent charge-discharge cycles and an average size in the range from around 0.2 to around 40 microns (more preferably from around 0.4 to around 20 microns) may be particularly attractive for battery applications in terms of manufacturability and performance characteristics. Electrodes with electrode capacity loading from moderate (e.g., about 2-4 mAh/cm$^2$) to high (e.g., about 4-12 mAh/cm$^2$) are also particularly attractive for use in cells. Furthermore, a near-spherical (spheroidal) shape of these composite particles may additionally be attractive in some designs for optimizing rate performance and volumetric capacity of the electrodes in certain applications. In spite of some improvements that may be achieved with the formation and utilization of such alloying-type or conversion-type nanocomposite anode materials, however, substantial additional improvements in cell performance characteristics may be achieved with the improved composition and preparation of electrodes, beyond what is known or shown by the conventional state-of-the-art. The relatively low density of such composite anode materials (e.g., about 0.5-2.5 g/cc, at the particle-level) may make uniform slurry mixing, coating deposition, and calendaring (electrode densification) more challenging and require special methodologies for optimal performance. In addition, such nanocomposites may be coated with a carbon outer layer, which is less polar compared to conventional intercalation-type cathodes and thus may make such nanocomposite particles more difficult to disperse in some solvents.

Unfortunately, high-capacity (nano)composite anode and cathode powders, which exhibit moderately high volume changes (e.g., about 8-180 vol. %) during the first charge-discharge cycle, moderate volume changes (e.g., about 4-50 vol. %) during the subsequent charge-discharge cycles, an average size in the range from around 0.2 to around 20 microns and relatively low density (e.g., about 0.5-3.8 g/cc, at the particle level), are relatively new and their formation into electrodes using conventional binders, conductive additives, and mixing protocols may result in relatively poor performance characteristics and limited cycle stability, particularly if electrode capacity loading is moderate (e.g., about 2-4 mAh/cm$^2$) and even more so if it is high (e.g., about 4-12 mAh/cm$^2$). Larger volume changes (particularly during the initial cycles) may lead to inferior cell performance.

Surprisingly, binder and conductive additives that work well for intercalation-type anode and cathode electrodes (of various particle size) as well as binders and conductive additives that work well for nano-sized (e.g., in the range from 1 nm to 200 nm) conversion-type anode and cathode electrodes or alloying-type anodes perform poorly for high-capacity (nano)composite anode and cathode powders, which exhibit moderately high volume changes (e.g., about 8-180 vol. %) during the first charge-discharge cycle, moderate volume changes (e.g., about 4-50 vol. %) during the subsequent charge-discharge cycles and an average size in the range from around 0.2 to around 40 microns (in some designs, from around 0.2 to around 40 microns). The larger size of such composites and the larger volume changes in such composites may lead to poorer performance characteristics when used in combination with certain binders (e.g., those conventionally used with nanosized conversion-type anode and cathode electrodes or alloying-type anodes).

Multiple routes have been described to overcome some of the above-discussed challenges of various types of nanocomposite electrode materials (for example, those comprising conversion-type and alloying-type materials) that experience certain volume changes during cycling (for example, moderately high volume changes (e.g., about 8-180 vol. %) during the first charge-discharge cycle and moderate volume changes (e.g., about 4-50 vol. %) during the subsequent charge-discharge cycles), an average size in the range from around 0.2 to around 20 microns and specific surface area (e.g., as measured using BET or DFT analysis of $N_2$ sorption or Ar or $CO_2$ sorption isotherms) in the range from around 0.1 $m^2$/g to around 100 $m^2$/g (in some designs, from around 0.5 $m^2$/g to around 20 $m^2$/g) for a broad range of batteries. Other routes have also been described to formulate substantially more stable electrodes in moderate (e.g., about 2-4 mAh/$cm^2$) and high capacity loadings (e.g., about 4-12 mAh/$cm^2$) from such and other materials. One or more embodiments of the present disclosure provide still further (e.g., alternative, and in some designs, more attractive) methodologies and advantageous electrode/electrolyte compositions for such nanocomposite electrode materials. One or more embodiments of the present disclosure also provide additional insights concerning previously described routes. The description below describes advantageous formation of electrodes primarily from such nanocomposite electrode particles. However, in some designs or scenarios, other (e.g., "regular") electrode particles (e.g., of so-called intercalation-type) or electrodes that comprise both "regular" (intercalation-type) electrode particles and conversion-type or alloying-type electrode particles may benefit from some aspects of this disclosure.

Through various studies, the inventors have found that electrodes based on high capacity nanocomposite powders (comprising conversion- or alloying-type active materials) that experience certain volume changes during cycling (moderately high volume changes (e.g., an increase by about 8-180 vol. % or a reduction by about 8-70 vol. %) during the first charge-discharge cycle and moderate volume changes (e.g., about 4-50 vol. %) during the subsequent charge-discharge cycles) and an average size in the range from around 0.2 to around 20 micron (such as Si-based nanocomposite anode powders, among many others) and specific surface area (e.g., as measured using BET or DFT analysis of $N_2$ sorption or Ar or $CO_2$ sorption isotherms) in the range from around 0.1 $m^2$/g to around 100 $m^2$/g (in some designs, from around 0.5 $m^2$/g to around 20 $m^2$/g) may require very specific types of binders and, in some cases, special electrode processing for significantly improved performance (particularly for high capacity loadings).

For example, (i) continuous volume changes in high capacity nanocomposite particles during cycling in combination with (ii) electrolyte decomposition on the electrically conductive electrode surface at electrode operating potentials (e.g., mostly electrochemical electrolyte reduction in case of Si-based anodes) may lead to a continuous (even if relatively slow) growth of a solid electrolyte interphase (SEI) layer on the surface of the nanocomposite particles. If binders are used that swell substantially (e.g., by around 5-100 vol. % or reduce their modulus by over around 15-20%) in electrolytes (e.g., PVDF binders and the like), the interface between the nanocomposite particles and conductive carbon additives becomes filled with an SEI (electrolyte decomposition products) even if the binder coats and separates this interface from direct access of electrolyte. This is because electrolyte slowly permeates/penetrates through such "swellable" binders. The SEI growth at the composite electrode particles/conductive additive(s) interface leads to a gradual increase in the separation distance between the surface of the composite electrode particle and the attached conductive additive particle(s). A higher degree of swelling in electrolyte (stronger reduction in modulus) may lead to faster separation. This increase in separation distance may undesirably increase the composite electrode particle/conductive additive particle(s) contact resistance. Notably, at some point (e.g., after some threshold number of charge-discharge cycles) the separation may reach a critical value that corresponds to the situation when a conductive additive particle(s) and composite electrode particle become effectively electrically separated or disconnected (e.g., when the separation distance exceeds substantially a threshold distance that typically provides at least a moderate (e.g., greater than 0.1%) probability for quantum tunneling of electrons between the separated particles). A similar phenomenon may happen at the composite electrode particle/another composite electrode particle interfaces as well as the composite particle/current collector interfaces in the electrode. Once an electrode particle becomes electrically separated from other particles and the current collector of the electrode, it effectively stops being able to accept or donate electrons and thus cannot participate in electrochemical reactions (which are required for charge storage in a battery). As such, the electrode capacity becomes reduced by the capacity of this separated particle. The gradual electrical (or electrochemical) separation of the various active composite electrode particles within the electrode leads to undesirable irreversible losses of electrode (and thus battery) capacity and eventual cell "end of life". Higher binder swelling in electrolytes may lead to faster cell degradation and shorter cycle stability. Because higher temperature typically increases SEI growth rate and electrolyte diffusion through the binders, stable cell operation at above around 40-50° C. (often required for commercial cells) becomes particularly challenging to achieve. In contrast, conventional (intercalation-type) electrode materials exhibit a stable SEI and thus could be used with a broad range of binders, including those that exhibit substantial swelling in battery electrolytes.

Swelling of binders in electrolytes depends on both the binder and electrolyte compositions. Furthermore, such swelling (and the resulting performance reduction) often correlates with the reduction in elastic modulus upon exposure of binders to electrolytes. In this sense, the smaller the reduction in modulus, the more stable the binder-linked (protected) composite active particles/conductive additives interface becomes. The reduction in binder modulus by over about 15-20% may result in a noticeable reduction in performance. The reduction in the binder modulus by two times (2×) may result in a substantial performance reduction. The reduction in modulus by five or more times (e.g. 5×-500×) may result in a very significant performance reduction. Such "swellable in electrolyte" binders may exhibit either higher or (more often) lower maximum elongations (maximum strain) when exposed to electrolyte (reduction of maximum elongation may be undesirable). Exposure of electrodes with such binders to electrolyte may also weaken the interfaces between these binders and (nano) composite electrode particles, conductive additives and current collectors, which may be undesirable.

Unfortunately, binders that exhibit no or small (e.g., about 0.001-2 vol. %) swelling upon exposure to electrolytes (such as various salts of Carboxymethyl cellulose (CMC) including, but not limited to Na-CMC, Li-CMC, K-CMC, etc., poliacrylic acid (PAA) and their various salts (Na-PAA, Li-PAA, K-PAA, etc.), various acrylic binders, various alginates (alginic acid and various salts of alginic acids) and most of other water-dissolvable binders in case of Li-ion batteries based on organic electrolytes) may be too brittle (even when exposed to electrolyte) for use in a cell with conversion-type or alloying-type particles of interest. Furthermore, such binders may also be more rigid. As a result, such binders may not be able to accommodate (nanocomposite) particle volume change-induced stresses well and, as a result, induce significant stress concentration at the particle/binder interfaces, which may become weak points within the electrodes and lead to rapid electrode degradation during cycling (e.g., when particles get separated from the binder-carbon additive mix during cycling). Interestingly, when certain conversion-type or alloying-type particles exhibit small characteristic dimensions (e.g., below around 200 nm), the brittle nature of such binders surprisingly does not induce a significant negative effect because the microcracks formed in such binders during cycling do not induce electrical separation between the very small active particles as these binders effectively form micro and nanoporous structures, which may be resistant to propagation of small cracks at the particle/binder interfaces. In contrast, when such binders are used with large volume-changing particles (e.g., from around 200 nm to around 40 micron) the brittle nature of the binders may lead to the mechanical failure of the electrode particle/conductive additive-binder interface (or mechanical failures of other portions of the binder that lead to capacity losses). This negative effect becomes particularly pronounced when the mass fraction of conductive additives in an electrode is small (e.g., below around about 2-5 wt. %) or when the volume changing electrode particles are bigger (e.g., from around 1-2 micron to around 40 micron). This negative effect becomes also particularly pronounced when the casted (on current collector foils) electrode capacity loading becomes moderate (e.g., about 2-4 mAh/cm$^2$) and even more pronounced when it becomes high (e.g., about 4-12 mAh/cm$^2$).

Certain larger particles, on the other hand, exhibit smaller specific surface area in contact with electrolyte and thus offer a lower rate of undesirable side reactions (e.g., smaller volume fraction of the SEI or other types of surface layers, less electrolyte decomposition, less dissolution of electrode materials, etc.). In addition, certain larger particles are easier to handle and process into electrodes. Finally, larger particles may require less binder and conductive additives for sufficiently stable performance, which may be advantageous in terms of maximizing gravimetric electrode capacitance, rate performance and, in some cases, cell stability. Therefore, the use of large particles may be preferable in some designs, although these may not perform well with some of the brittle (in electrolyte) binders. Similarly, it may be advantageous in some designs to use a smaller fraction of conductive additives in an electrode because conductive additives occupy space (and thus reduce volumetric and gravimetric capacity of electrodes) and may induce undesirable side reactions (e.g., SEI formation, electrolyte decomposition, etc.) on their surface. Therefore, the use of small (e.g., below about 5 wt. % or 5 vol. %, even more preferably below about 2 wt. % or 2 vol. %) amounts of conductive additives may be preferable for cell operation, although electrodes with a smaller fraction of conductive additives may not perform well with some of the brittle (in electrolyte) binders in combination with high-capacity volume-changing composite electrode particles, especially for high capacity loadings.

Electrode slurries with binders dissolved in organic solvents (e.g., NMP or toluene or other organic solvents) may be acceptable for electrode preparation. However, fabrication and utilization of water-based electrode slurries (that comprise active particles, conductive additives, other functional additives and binders) offer cost and ecological advantages. Therefore, binders that may be dissolved in water or dispersed in water (e.g., solvent-less binders) are highly advantageous for use in battery (e.g., Li-ion battery) electrodes.

In some designs, it may be advantageous to utilize ultrasound (sonication) in at least one of the slurry mixing stages to improve dispersion of the components (e.g., conductive additives or the active powders, etc.). In some designs, mechanical shear mixing may be advantageously combined with sonication (in some designs, concurrently or at the same time) to prepare a slurry. In some designs, the shear mixing may be effectively utilized at a power density in the range from around 0.01 kW/L-slurry to around 30 kW/L-slurry. In some designs, the sonication may be effectively utilized at a power density in the range from around 0.05 kW/L-slurry to around 50 kW/L-slurry. In certain applications, lower power density may be insufficient to provide sufficiently good electrochemical performance (possibly due to insufficiently good dispersion of components), while higher power density may induce undesirable damage to conductive additives, active particles and binders. In some designs, ultrasonic flow-through systems may be effectively utilized.

Certain water-based slurries may suffer from substantial foaming during their formation. This undesirable process often originates from the formation of bubbles in the binder/water solution during agitation/mixing. In order to process/prepare these slurries properly (without undesirable formation of bubbles), it may be advantageous to add a secondary solvent (for example, ethanol or methanol or other suitable alcohols or low surface tension (e.g., below around 33 mN/m, more preferably below around 28 mN/m, most preferably below about 26 mN/m at 20° C.) co-solvents) in order to reduce foaming by reducing the surface tension of the water-based slurry system. A suitable amount of low surface tension co-solvent(s) (as a portion of all solvents in a water-based slurry) may range from around 0.1 vol. % to around 30 vol. %, depending on a slurry/binder composition and content as well as the mixing conditions (pressure, agitation rate, etc.).

In some designs, casted (or casted and dried or casted, dried and calendered/densified) electrodes (including those produced using water-based slurries) may benefit from stress-relieving (or local binder re-distribution) processing, such as heating at elevated temperatures. Depending on the binder glass transition temperature, electrode chemistry and thermal stability of the current collectors, binder and active particles, the heating temperature may range from around 30° C. to around 400° C. and heating pressure may range from vacuum (e.g., 0.000000000001 atm.) to around 10,000 atm. Furthermore, such stress-relieving (or local binder re-distribution) processing may be improved by exposure of the formed electrodes to a humid (for water-soluble or at least water-swellable binders) environment (or, more generally, to a solvent-comprising environment) for a period from around 1 second to around 30 days (more preferably, from around 10 min to around 3 days). The suitable humidity (more generally, solvent vapor fraction in the gaseous environment) may range from around 1.0% to around 100% (in some designs and active materials, more preferably from around 10% to around 100%). Depending on the binder properties, electrode chemistry, electrode-binder interactions, binder-current collector interactions, thermal stability (and corrosion-resistance) of the current collectors and active particles, solvent composition and other parameters, the environment temperature during this exposure may range from around −20° C. to around +400° C. (more preferably, from around +20 to around +100° C.) and heating pressure may range from vacuum (e.g., 0.000000000001 atm) to around 10,000 atm. In this case, for certain applications, electrode (and cell) stability may be substantially enhanced. In some designs, such exposure may not only relieve stresses, but also advantageously re-distribute binder within the electrode in a beneficial way (for example, in such a way as to enhance electrolyte diffusion within the electrode or concentrating more binder at the contact between the electrode particles, while removing the binder from the other portions of the particle surface, where it only blocks electrolyte access but does not enhance particle-to-particle bonding strength, etc.). In some designs, such a controlled humidity exposure may be integrated into the roll-to-roll coating process (e.g., after electrode travelling through the drying oven it may be exposed to a humid environment at elevated temperatures and then dried again). In some designs, such heat treatment(s) may induce favorable changes in the binder composition.

In some designs, the electrode coating (at least on one side of the current collector) may not be uniform and may exhibit either a gradient in composition or porosity through the electrode thickness or have inserted layers of tunable composition, porosity and morphology for improved performance. For example, the electrode may have multiple layers of thinner coatings stacked on top of the current collector (like strata in sedimentary rock), with each layer having a different set of properties for improved performance or reduced lateral expansion (e.g., if some layers exhibit lower specific capacity and expansion, but much higher strength and modulus when measured in a horizontal/lateral direction; such layers may comprise 1D or 2D particles). The composition of the electrode (or individual layers) may vary from top to bottom (e.g., may differ in binder content, conductive additive content or type or shape, particle size or shape, binder type, etc.). In one example, an electrode may comprise 2-3 (e.g., thicker) individual layers having variable binder and conductive additive content with 1-2 (e.g., thinner) interlayers (and 1 optional surface layer) comprising lower % active content and higher content of binder(s) or conductive additives to act as adhesion interlayers. The 2-3 "thicker" layers may, for example, gradually increase their % active content (e.g., having lower content of active (nano)composite particles or having (nano)composite particles that exhibit lower capacity and lower volume changes during cycling) from the current collector surface (bottom) to the top (surface) of the electrode.

In some designs, copolymerization of the different monomers adds a useful lever to tune the final properties of the final polymeric binder for beneficial performance. For example, the copolymer may be produced to have segments that allow good dispersion in slurry solutions (e.g., in aqueous solutions or suspensions) and strong adhesion to active particles (while, in some designs, exhibiting relatively small maximum elongation in electrolyte of, for example, about 0.1-10%) and also have segments that allow for sufficient expansion (elongation) without breakage when exposed to electrolyte (for example, about 10-500%). In this case, volume changing particles may not induce catastrophic polymer binder failure (for example, breakage of the binder-particle interface or fracture of the binder somewhere between the volume-changing neighboring particles) and resulting gradual electrode disintegration during cycling, which may be highly advantageous. These polymers (copolymers) may be prepared by conventional solution polymerization methods or may be made in the form of water-based latexes. Different preparation methods may be used for different applications. In some designs, binders made in latex form may be additionally copolymerized with bi-functional monomers in order to fine-tune mechanical and adhesive properties of such binders.

In some applications, it may be advantageous to use water-soluble copolymer binders. In some designs, copolymer binders may comprise a simple linear-chain structure (e.g., if it may be desirable to have plastic deformation within a binder at room or elevated temperatures to accommodate volume changes within electrode particles during charging or to accommodate electrode deformation during calendaring, which, in turn, may be done either at room or, in some designs, at elevated temperatures). In other designs, copolymer binders may be cross-linked. In some designs, cross-linked co-polymer binders may be utilized in the slurry (e.g., to reduce swelling or dissolution, for example, in water). In some designs, cross-linking may take place after the electrode casting. In some designs, it may be advantageous to induce some cross-linking after electrode calendaring (e.g., to allow plastic deformation and stress relief during and/or after calendaring). In some designs, it may be advantageous to induce cross-linking after the battery assembling (e.g., during so-called "formation cycles" or after the initial electrode expansion) in order to enhance mechanical strength/integrity/stability of the electrode after the initial expansion.

In some designs, water-soluble copolymer binders may comprise at least one of the following components: vinyl (or butyl or methyl or propyl, etc.) acetate, vinyl (or butyl or methyl or propyl, etc.) acrylic, vinyl (or butyl or methyl or propyl, etc.) alcohol, vinyl (or butyl or methyl or propyl, etc.) acetate-acrylic, vinyl (or butyl or methyl or propyl, etc.) acrylate, styrene-acrylic, alginic acid, acrylic acid, vinyl (or butyl or methyl or propyl, etc.) siloxane (or other siloxanes), pyrrolidone, sterene, various sulfonates (e.g., styrene sulfonate, among others), various amines (incl. quaternary amines), various dicyandiamide resins, amide-amine, ethyleneimine, diallyldimethyl ammonium chloride.

In some designs, copolymer binders may comprise poly (acrylamide) (that is comprise acrylamide ($-CH_2CHCONH_2-$) subunits). In some designs, such poly (acrylamide)-comprising copolymer binders may be water soluble. In some designs, such poly(acrylamide)-comprising copolymer binders may also comprise acrylic acid, carboxylic acid, alginic acid or metal salt(s) thereof (e.g., Na, K, Ca, Mg, Li, Sr, Cs, Ba, La and other salts of such acids). Such and other additions may be utilized to tune the ionic character of the polymer, its solubility and interactions with both the solvents and active (electrode) particles (e.g., to achieve stability of a slurry, etc.).

In some designs, anion conducting heterogeneous polymers (such as alkoxysilane/acrylate or epoxy alkoxysilane, etc.), various anion conducting interpenetrating polymer networks, various anion conducting poly (ionic liquids) (cross-linked ionic liquids) or poly(acrylonitriles), various anion conducting polyquaterniums, various anion conducting comprising quaternary ammonium salts (e.g., benzyltrialkylammonium tetraalkylammonium, trimethyl ammonium, dimethyl ammonium, diallyldimethylammonium, etc.), various anion conducting copolymers comprising ammonium groups, various anion conducting copolymers comprising norbornene, various anion conducting copolymers comprising cycloalkenes (e.g., cyclooctene), methacrylates, butyl acrylate, vinyl benzyl or poly(phenylene), various anion conducting copolymers comprising organochlorine compounds (e.g., epichlorohydrin, etc.), various anion conducting copolymers comprising ethers, bicyclic amines (e.g., quinuclidine), various anion conducting poly (ionic liquids) (cross-linked ionic liquids), various anion conducting copolymers comprising other amines (e.g., diamines such as ethylene diamine, monoamines, etc.), various anion conducting copolymers comprising poly(ether imides), various polysaccharides (e.g., chitosan, etc.), xylylene, guanidine, pyrodinium, among other units, may be advantageously used as copolymer binders (or components of the polymer/copolymer binder mixture) in the context of the present disclosure. In some designs, copolymer binder may be cationic and highly charged.

In some designs, various cation conducting polymers (including interpenetrating polymer networks) and cross-linked ionic liquids (e.g., with cation conductivity above around $10^{-10}$ S sm$^{-1}$) may be advantageously used with the particles of interest as binders or components of binders in the context with one or more embodiments of the present disclosure. In some designs, such polymers may advantageously exhibit medium-to-high conductivity (e.g., above around $10^{-10}$ S sm$^{-1}$, or more preferably above around $10^{-6}$ S sm$^{-1}$) for Li ions (in the case of Li or Li-ion batteries).

In some designs, various electrically conductive polymers or copolymers (e.g., preferably with electrical conductivity above around $10^{-2}$ S sm$^{-1}$), particularly those soluble in water (or at least processable in water-based electrode slurries) may be advantageously used as binders or components of binders (e.g., components of the binder mixtures or components of co-polymer binders) in the context of this disclosure. In particular, sulfur (S) containing polymers/copolymers, also comprising aromatic cycles, may be advantageously utilized. In some examples, S may be in the aromatic cycle (e.g., as in poly(thiophene)s (PT) or as in poly(3,4-ethylenedioxythiophene) (PEDOT)), while in other examples, S may be outside the aromatic cycle (e.g., as in poly(p-phenylene sulfide) (PPS)). In some designs, suitable conductive polymers/co-polymers may also comprise nitrogen (N) as a heteroatom. The N atoms may, for example, be in the aromatic cycle (as in poly(pyrrole)s (PPY), polycarbazoles, polyindoles or polyazepines, etc.) or may be outside the aromatic cycle (e.g., as in polyanilines (PANI)). Some conductive polymers may have no heteroatoms (e.g., as in poly(fluorene)s, polyphenylenes, polypyrenes, polyazulenes, polynaphthalenes, etc.). In some designs, the main chain may comprise double bonds (e.g., as in poly(acetylene)s (PAC) or poly(p-phenylene vinylene) (PPV), etc.). In some designs, it may be advantageous for the polymer/copolymer binders to comprise ionomers (e.g., as in polyelectrolytes where ionic groups are covalently bonded to the polymer backbone or as in ionenes, where ionic group is a part of the actual polymer backbone). In some designs, it may be advantageous to use a polymer mixture of two or more ionomers. In some designs, such ionomers may carry the opposite charges (e.g., one negative and one positive). Examples of ionomers that may carry a negative charge include, but are not limited to various deprotonated compounds (e.g., if parts of the sulfonyl group are deprotonated as in sulfonated polystyrene). Examples of ionomers that may carry a positive charge include, but are not limited to various conjugated polymers, such as PEDOT, among others. An example of the suitable polymer mixture of two ionomers with opposite charges is poly(3,4-ethylenedioxythiophene) polystyrene sulfonate. In some designs, it may be advantageous to use polymer binders that comprise both conductive polymers and another polymer, that provides another functionality (e.g., serve as an elastomer to significantly increase maximum binder elongation or serve to enhance bonding to active materials or current collector, or serve to enhance solubility in water or other slurry solvents, etc.).

In some designs, copolymer binders may advantageously comprise halide anions (e.g., chloride anions, fluoride anions, bromide anions, etc.). In some designs, copolymer binders may advantageously comprise ammonium cations (e.g., in addition to halide anion, as, for example, in ammonium chloride). In some designs, copolymer binders may advantageously comprise sulfur (S). In some designs, copolymer binders may advantageously comprise allyl group (e.g., in addition to ammonium cations). For example, such copolymer binders may advantageously comprise diallyldimethylammonium chloride (DADMAC) or diallyldiethylammonium chloride (DADEAC). Other suitable examples of such copolymer binder components may include (but are not limited to): methylammonium chloride, N,N-diallyl-N-propylammonium chloride, methylammonium bromide, ethylammonium bromide, propylammonium bromide, butylammonium bromide, methylammonium fluoride, ethylammonium fluoride, propylammonium fluoride, butylammonium fluoride, to name a few.

In some designs, copolymer binders may comprise both poly(acrylamide) and ammonium halides (e.g, ammonium chloride) in their structure. As one suitable example, poly (acrylamide-co-diallyldimethylammonium chloride) (PAMAC) may be advantageously used as a copolymer binder in the context of the present disclosure. In some designs, such PAMAC copolymer binders may additionally comprise minor (e.g., less than around 5-10 wt. %) amounts of acrylic acid, carboxylic acid or alginic acid or metal salt(s) thereof (e.g., Na, K, Ca, Mg, Li, Sr, Cs, Ba, La and other salts of such acids).

In some designs, uniform coverage of the composite (anode or cathode) active materials with a conformal polymer binder layer may undesirably reduce rate performance, capacity utilization and cycle stability in full cells. In one example, the polymer binder covers less than about 75% of an external surface area of the Si-comprising active material particles in the electrode coating with an average thickness of more than about 5 nm, while another portion (e.g., about 25-95%) of the external surface area of the Si-comprising active material particles comprise no binder coating (so that there is a direct contact with the electrolyte) or only have a very thin (e.g., an average thickness of less than about 5 nm, such as in a range between about 0.25-5.0 nm) layer may be beneficial for cell performance. In some designs, in may be advantageous for a significant portion of the binder (e.g., about 25.00-99.99%) to be located at the proximity (e.g., within about 10-200 nm) of the contact points between composite particles. In some designs, it may be advantageous for at least one component of the (polymer) binder to be in the form of the (polymer) (nano)fibers. In this case, when such binder fibers coat particles in an electrode, a significant portion of the particle external area remain directly exposed to electrolyte. In some designs, a suspension of such binders (instead of the solution of such binders) may be used in a slurry for electrode formulations. In some designs, polymer binder (nano)fibers may be produced in a slurry during mixing from polymer particles. In some designs, such fiber-shaped polymer binders may comprise fluoropolymer. Examples of suitable fluoropolymers include but are not limited to polytetrafluoro ethylene (PTFE), polyperfluoroprophylene, higher polyperfluoroalkenes and their copolymers in different ratios, perfluoroalkoxy, fluorinated ethylene propylene, Teflon™ amorphous fluoroplastics (AF) polymers. In some designs, fiber-shaped polymer binders may comprise aramid. In some designs, fiber-shaped polymer binder may comprise functional groups that form either chemical bonds or strong hydrogen bonds with active materials. In some designs, fiber-shaped polymer binder may comprise functional groups that form either chemical bonds or strong hydrogen bonds with conductive additives. In some designs, fiber-shaped polymer binder may be electrically conductive. In some designs, a fiber-shaped polymer binder suspension (component 1) may be advantageously used in combination with a polymer binder solution (component 2) in an electrode slurry. In some designs, such a combination may offer enhanced electrode uniformity and/or enhanced electrode mechanical properties (e.g., enhanced adhesion or cohesion or tensile strength or fracture toughness, etc.).

In some examples, the binders may additionally exhibit sufficiently strong adhesion to (nano)composite electrode particles (particularly when exposed to electrolyte). To enhance binder/(nano)composite electrode material particle interface strength (in order to withstand electrode integrity and electrical inter-connectivity of the (nano)composite particles in the electrode during cycling in a cell), certain functional groups may be added to the binder (e.g., via copolymerization or other means), certain functional groups may be added to the electrode particles, or, in some cases, certain functional groups may be added to the conductive additives, or a combination of such approaches may be employed.

In some designs, various types of nanocomposite electrode materials (for example, conversion-type and alloying-type materials) that experience certain volume changes during cycling (for example, moderately high volume changes (e.g., about 8-180 vol. %) during the first charge-discharge cycle, moderate volume changes (e.g., about 5-50 vol. %) during the subsequent charge-discharge cycles) and an average size in the range from around 0.2 to around 20 microns may be advantageously produced with conductive carbon present on their surface (e.g., as a part of the shell in core-shell composites or as part of the composite, etc.).

In the context of one or more embodiments of the present disclosure, the addition of chemical moieties to the surfaces of the (nano)composite electrode particles of interest may provide many advantages. The chemical moieties are arranged with one or more chemical properties that are distinct from a remainder of the at least one conductive active material particle. In one example, changes in the particle surface chemistry may provide improved dispersibility during electrode slurry preparation (particularly, in water-based electrode/binder slurries). Furthermore, changes in the surface chemistry may lead to favorable changes in the interfacial interactions with active particles, conductive additives, binders, electrolyte, and/or SEI. Overall, functionalization of the (nano)composite electrode particle surface may introduce a handle for the formation of strong covalent bonds between various electrode particles and a binder or conductive additives (e.g., single or multi-walled carbon nanotubes, graphene, graphite flakes, carbon black, carbon fibers, conductive nanowires or nanofibers, etc.).

As described above, the introduction of chemical moieties comprising polar groups to the surface of (nano)composite particles may provide improved dispersibility in polar solvents, such as water, N-methylpyrrolidinone, N,N-dimethylformamide, alcohols, and others, which allows for more uniform slurry mixtures and thus a more uniform electrode. Introduction of non-polar groups, such as alkyl chains, may provide improved dispersion in non-polar solvents such as aliphatic hydrocarbons. Other examples of suitable functional groups include, but are not limited to, acid groups (e.g., carboxylic acids), alcohol groups (e.g., phenolic functional groups), amines, sulfates, ammonium, amides, esters, ethers, alkyl, alkenes, alkynes, phosphates, carboxylic acids, quaternary amines, aldehydes, poly(ethyleneoxide) chains, fluorides, nitrates, halides, epoxides, lactones, ketones or aryls. These groups may be attached directly to the surface of the (nano)composite particles or to other functional groups (e.g., to linear or branched functional groups, such as alkyl chains, the aryl group, etc.) that are, in turn, attached to the (nano)composite particles.

Figure 2:
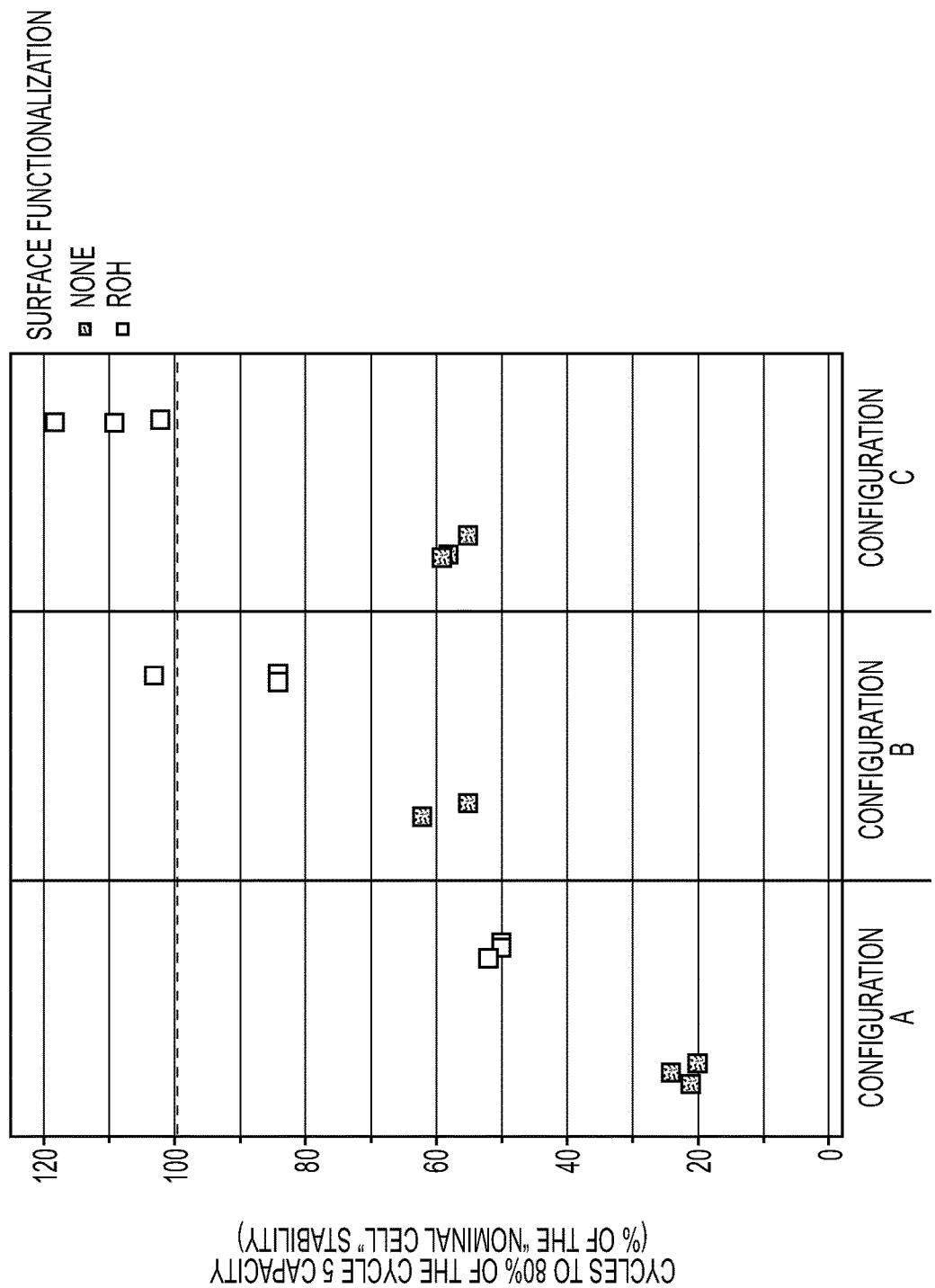
FIGS. 2-4 and 6-7 illustrate examples of selected Li-ion battery performance characteristics produced with example electrodes (anodes) and provided for illustration of some of the described embodiments.

FIG. 2 illustrates an example of the impact of functionalization of (nano)composite Si-comprising volume-changing anode particles (mostly with alcohol functional groups ROH) on the stability of full cells built with high area loading (of such Si-comprising) anodes and LCO cathodes in accordance with an embodiment of the present disclosure. The (nano)composite Si-comprising anode particles (e.g., powders) in this example exhibit an average particle size of around 3.7 micron. The amount of inactives (binder and conductive additives) in this anode was around 5 wt. %. Different anode configurations correspond to slightly different electrode formulations. For all the formulations, formation of the ROH functional groups improved anode stability.

In some designs, formation of bonds between the active particles and binder or conductive carbon additives may provide many benefits, such as increased mechanical stability of the electrode, help with maintaining electronic conductivity (despite SEI formation and growth), stabilization of various interfaces, reduction of the degree of swelling of the electrode/binder interface and others. This is particularly critical for the described particles of interest due to their volume changes during cell operation.

In some designs, it may be advantageous to chemically bond polymers to the surface of the composite (anode or cathode) active particles prior to final slurry formulation and electrode casting onto a current collector. Such an approach may help to better disperse the particles uniformly within a slurry and the electrode. In some designs, no additional binder may be utilized during the slurry formulations or mixing. In other designs, additional binder may be added during the slurry mixing. In other designs, additional binder may be of different composition or properties (e.g., different molecular weight, different functional groups, different glass transition temperature, different shape, etc.) relative to another binder used in the slurry. In some designs, this additional binder may form chemical bonds with the polymer bonded to the surface of the particles. In some designs, it may be advantageous to bond (chemically attach) conductive additives to the surface of the composite (anode or cathode) active particles prior to final slurry formulation and electrode casting onto a current collector. In some designs, such an attachment may be done using a polymer. In some designs, no additional conductive additives may be utilized during the slurry formulations or mixing. In other designs, additional conductive additives (of the same or different type or size) may be added during the slurry mixing. Such approaches may not only enhance performance of the electrodes in cells, but also reduce variations in electrode coating quality or properties when different equipment (e.g., different size or configurations) or slightly different mixing environment (e.g., different humidity or different pressure) or slightly different binder or conductive additives are used (e.g., different age or different properties or different contaminants, etc.).

To form bonds between electrode components, complimentary functional groups that can form covalent bonds may be introduced. These functional groups may be either integrated into the material itself (for example, alcohol groups in PVA binders or acid groups in PAA binders or amine groups or ammonium present in other suitable binders, to name a few), be introduced during a surface functionalization process, or be a part of separate additive(s). In some designs, these should be bonds that preferably do not form (or do not form to a significant extent) during slurry mixing or coating. Instead, these bonds should preferably form at elevated temperature(s) and/or reduced pressure(s) during electrode drying. This approach may be used to form linkages between active particles and binder(s), active particles and conductive additives, conductive additive particles and other conductive additive particles, active particles and other active particles, binders and conductive additives. Examples of types of bond-forming complimentary functional groups include, but are not limited to esterification of alcohols and acids to form esters; Diels-Alder reactions of dienes and unsaturated hydrocarbons to form cyclic hydrocarbons; 1,3-cycloaddition of azides and alkynes to form 1,2,3-triazoles; cycloaddition of tetrazine and alkenes to form 1,2-diazines; cycloaddition of tetrazoles and alkenes to form 1,2-diazoles; nucleophilic ring-opening of epoxides or aziridines by a nucleophile (for example, a carboxylic acid or carboxylate); reaction of isocyanates and alcohols to form carbamates; Williamson reaction of alkoxides and alkyl halides to form ether bonds. Covalent bond forming methods may be used with a separate crosslinking additive included to connect electrode components. By addition of a crosslinking reagent that contains two or more of the required functional groups with complimentary groups on one or more components in the electrodes, the electrode components may be linked.

In some designs, at least one type of the polymer binders in the electrode may exhibit side groups (or side chains) and may be characterized by a degree of hydrolysis (e.g., percentage of side groups that are hydroxyl). In some designs, it may be advantageous for such polymers to exhibit a degree of hydrolysis in the range from about 50% to about 99.0% (the particular optimum value may depend on the slurry composition and, in case of water-based slurries, pH). In some designs, higher degrees of hydrolysis may enhance bonding of the binder to a current collector or certain (active or inactive) particles in the electrode and may additionally reduce foaming in aqueous (water-based or at least water-containing) slurries. Excessive degrees of hydrolysis, however, may induce formation of aggregates during the slurry mixing in some designs.

Crosslinkers may be used to link between specific components of the electrode or between two or more electrode components. A crosslinker may be used to link between polymer chains of a binder to decrease swelling in electrolyte. Alternatively, a crosslinker may be used to link between the binder and active particles to increase mechanical stability of the interface. Alternatively, a crosslinker may be used to link between active particles and a conductive additive to help maintain electrical conductivity despite SEI formation.

In some designs, it may be advantageous to attach conductive additives to the volume-changing (nano)composite electrode particles by other mechanisms. In one example, conductive additives (e.g., carbon nanotubes or graphene or metal nanoparticles or metal nanowires) may be grown directly on the surface of the electrode particles (e.g., by CVD or by solution chemistry routes). In some designs, it may be advantageous to keep the CVD deposition temperature to below around 650° C. (in some designs, to below around 400° C.). In some designs, it may be advantageous to use catalyst-assisted CVD. In some designs, catalyst may comprise a transition metal. In some designs, catalyst may comprise iron (Fe). In another example, the conductive particles (of various shapes and sizes) may be strongly attached to the surface of the electrode particles by making the surface of each (or most) particle(s) charged and by using the opposite charge on the electrode particles vs. conductive additive particles. In yet another example, the conductive particles may be attached to the surface of the electrode particles by using an organic (e.g., a polymer) binder and carbonizing the binder to form a conductive carbon interlayer (which effectively acts as a conductive glue) between the conductive additive(s) and the electrode particle(s). In yet another example, a carbon layer may be CVD deposited on the mixture of conductive additive particles and active electrode particles, thereby preferentially depositing carbon at the contact points between the electrode particles and conductive additives. The CVD carbon layer may similarly act as a conductive glue to strongly attach conductive additive(s) to the electrode particle(s).

In some designs, it may be advantageous to grow/deposit polymer binders on the surface of the individual electrode particles using CVD. In this case of gas-phase reaction, the monomer(s) are delivered to the surface through the vapor phase and then undergo polymerization. By eliminating the need to dissolve macromolecules, CVD may reduce or prevent solvent damage to the substrate and may avoid issues of poor wetting and dispersion of the electrode particles. In some designs, CVD may be so-called "initiated" or so-called "oxidative".

In addition to the use of copolymer binder, in some designs it may be advantageous to utilize more than one binder in one or more embodiments of the present disclosure. For example, one binder which may exhibit very low swelling in electrolyte or stronger adhesion to the (nano) composite electrode particles and another binder which may exhibit significant plasticity and/or be more easily dissolvable in a slurry solvent (e.g., water). In some applications, it may be advantageous for the two binders to exhibit substantially different elastic modulus (when wetted by electrolyte). In some applications, it may be advantageous for the two binders to exhibit substantially different (e.g., by over 30%) solubility in a slurry solvent (or solvent mixture). If one of the binders exhibits lower solubility, the drying of a casted slurry may induce preferential adsorption of this binder onto the surface of the electrode particles while the other binder remains in a solution. The eventual drying of the electrode may thus induce a favorable distribution of the two binders—one binder (e.g., the one that provides stronger adhesion to the active electrode particles) preferentially located at the surface of the volume-changing (nano)composite electrode particles, while the other binder (e.g., softer and more deformable) in between the electrode particles to accommodate the volume changes without inducing undesirable cracks and defects within the electrode.

In some designs, it may be advantageous to form chemical bonds between the electrode and the current collector substrate (e.g., suitable metal (e.g., Cu or Al or Ti or Ni or suitable alloy) foil or mesh or conductive carbon-coated or conductive paint-coated foil or mesh, etc.). In some designs, approaches and chemistries described above for the formation of chemical bonds between the electrode polymer binder and the composite electrode particles may be suitable for the formation of chemical bonds between the electrode polymer binder and the current collector substrates.

In some applications, it may be advantageous to use a block-copolymer as at least one component of a binder mixture. For example, one block of the binder may have a strong affinity to the electrode particle surface and be swell-resistant (e.g., exhibit low swelling, such as less than about 5 vol. %) in the electrolyte, thus preventing or decreasing SEI formation at least at a portion of the electrode particle/conductive additive interface that otherwise may lead to their gradual electrical separation. A second block of the binder may be swellable in the electrolyte solvent and be sufficiently soft (in electrolyte) in order to tune one or more mechanical properties of the binder to withstand moderate volume changes during cycling without failure. Block-copolymer may be made by any suitable "living" type of polymerization methods, including but not limited to anionic, atomic transfer radical polymerization (ATRP), ring-opening metathesis polymerization (ROMP), reversible addition-fragmentation chain transfer (RAFT), and other suitable means. In an example, the particular type of the suitable polymerization technique may be defined by the chemical nature of the binder blocks.

In some designs when water is used as a slurry solvent (or a slurry co-solvent) for at least one of the mixing stages, it may be advantageous to deviate from a neutral pH. In one example, pH adjustment may be advantageous to induce a positive or a negative charge on the surface of active (nano)composite electrode particles or other particles in a slurry in order to achieve more uniform dispersion. In another example, pH adjustment may be advantageously used in order to induce controlled adsorption of at least one of the binder component(s) on the surface of active (nano)composite electrode particles. Depending on the composition and surface chemistry of the particles in a slurry as well as the binder composition, the optimal pH values may range from around 3 to around 12. Extreme pH values (e.g., less than 3 or greater than 12; depending on the composition of the slurry) may induce undesirable damage to the particles or the binder or another co-solvent (if present).

In some designs, it may be advantageous to use one dimensional (1D) conductive additives (such as single-walled carbon nanotubes (SWCNTs), double-walled carbon nanotubes (DWCNTs), multiwall carbon nanotubes (MWCNTs), carbon (nano)fibers, conductive metal carbide nanofibers (including those that comprise titanium metal), conductive metal nitride nanofibers (including those that comprise titanium metal), conductive metal carbonitride nanofibers (including those that comprise titanium metal), various compatible metal nanofibers and nanowires (e.g., copper or nickel or titanium or iron nanowires/nanofibers for low-voltage Li-ion battery anodes such as Si-based, Sn-based, C-based and others; aluminum or iron or nickel nanowires/nanofibers for high voltage Li-ion battery anodes, such as lithium titanate, P-based and others or the Li-ion battery cathodes, etc.)) in electrodes comprising the discussed high-capacity volume-changing (nano)composite materials. If metal nanowires or nanofibers are used as conductive additives, it may be advantageous for some of them (e.g., Cu or Ni or Ti or others) to be coated with a thin (e.g., about 0.2-10 nm) layer of conductive carbon or polymer (with optional functional groups on its surface) or other functional surface layer to (i) prevent their corrosion during the slurry preparation or handling or (ii) improve dispersion in a slurry or (iii) improve their adhesion in an electrode.

In some designs, it may be advantageous to use more than one type (or more than one size) of 1D conductive additives to form high-performing slurry formulation and the electrode. Some 1D conductive additives may exhibit better dispersion in a slurry and may be better suited for enhancing electrical conductivity of the polymer binder(s) and providing a good electrical contact between neighboring particles. The optimal linear dimensions of such conductive additives (e.g., made of SWCNTs, DWCNTs or MWCNTs, among others) may depend on the size and/or type of the composite particles, but are generally in the range from around 100 nm to around 10 microns (in average) (in some designs, from around 400 nm to around 5 microns in average length). Other 1D conductive additives may provide better through-electrode connectivity and electronic conductivity (even if they may exhibit entanglements or binder clogging or other undesirable side effects if used excessively in slurries). The optimal linear dimensions of such conductive additives (e.g., made of SWCNTs, DWCNTs, MWCNTs, carbon (nano) fibers, metal nanowires and nanofibers, among others) may depend on the size and/or type of the composite particles as well as the thickness of the electrode, but are generally in the range from around 0.2 microns to around 200 microns (in average). In some designs, the two different types of conductive additives may exhibit average linear dimensions that differ by about 3.0 to about 3,000 times.

In some designs, it may be advantageous to add conductive additives (for example, 1D additives) in several stages during the electrode slurry mixing. In one illustrative example, it may be advantageous to (i) mix some conductive additives and active (nano)composite materials in a solvent in a first stage and (ii) add binder (or binder solution or binder suspension) and additional conductive additives (or suspension of conductive additives) in the second or other stages. In some designs, it may be advantageous to have substantially (e.g., by 2-10,000 times) higher viscosity of the mix in the first stage (or at least one of the initial stages) than in the subsequent (or the final) slurry mix. It is possible that the observed improved performance in this case may be achieved due to the achievement of a higher effective shear rate needed to break up any agglomerates and more uniformly distribute slurry ingredients.

In some designs, it may be advantageous to infiltrate a conductive (e.g., carbon) additive into the electrode pores after the electrode casting (and, in some cases, after electrode drying) in order to enhance electrode conductivity and stability. In some designs, the amount of void filling conductive additives, the size of conductive additives, the surface charge of the additives, the infiltration method and the composition of the infiltration slurry (e.g., amount of a solvent in a conductive additive spray) may be optimized to prevent undesirable pore blocking and achieve desirable distribution of the additives within the electrode thickness. In some designs, better infiltration may be achieved by applying vacuum after coating application, thereby removing air trapped in interstitial voids to be replaced with conductive additive solution.

In some designs, it may be advantageous (although counter-intuitive) for enhanced stability (and, in some cases, for enhanced rate performance) to use a relatively small fraction (e.g., from around 0.5 wt. % to around 14.0 wt. %; in some designs from around 2.0 wt. % to around 8.0 wt. %) of all inactive components (such as binders and conductive additives (or other additives) combined) in the electrodes comprising (nano)composite materials as provided herein. Both larger and smaller amounts may lead to substantially inferior cell performance (in contrast to the conventional understanding that a larger content of additives and binder may be beneficial for stability of electrodes comprising medium-to-high volume-changing active materials). In particular, electrodes with medium (e.g., about 2-4 mAh/cm$^2$) or high (e.g., about 4-12 mAh/cm$^2$) areal loadings may benefit strongly from such small amounts (e.g., about 0.5-14.0 wt. % or, in some designs, about 2.0-8.0 wt. %) of binder/conductive additive mixtures (particularly those comprising 1D conductive additive materials, such as carbon nanotubes). The optimal amount of the conductive additives and the binders (and their relative ratios) in the electrode for a given application may depend on various parameters, including active particle size, electrode and active particle densities, binder chemistry and distribution within the electrode, type, composition and dimensions of conductive additives, volume changes in the active (nano)composite particles during cycling, and electrode thickness, among others.

In an example, the optimal wt. % of slurry components, given as a ratio of the mass of non-active components to the external surface area of (nano)composite active electrode particles, may exhibit values ranging from around 1 to around 5,000 m$^2$ active/g non-actives (more preferably from around 2 to around 30 m$^2$ active/g non-actives). The value may be optimized for a particular electrode composition and may depend on the size of the active particles, type of conductive additives, surface chemistry of the conductive additives, surface chemistry of the active particles, density of the particles, volume changes during cycling, type and molecular weight of the binder(s), thickness of the electrode, density of the electrode and other parameters. In an example, the optimal active/non-active ratio for spherical active particles may decrease with increasing particle size, due to greater strain at the particle exterior. The exact composition of the slurry may significantly impact both mechanical stability of the casted electrodes and the cell-level rate performance (e.g., excessive filling of interstitial space between the active (nano)composite particles with inactive material may reduce ion transport and have a negative effect on charge/discharge rate performance; insufficient amount of binders may induce mechanical failure; insufficient amount of conductive additives may reduce both cycle stability and electrode rate performance; etc.). Multiple examples of suitable binders and conductive additives are described hereinabove. In an example, when the binder preferentially adheres to conductive additives (which may be undesirable in some applications), the ratio of binder to conductive additive may be sufficient for the binder to still be available to bind to (nano)composite active particle surfaces (insufficient binder may preferentially coat the surface of the conductive additives, weakening active particle connections). In one example embodiment with mostly (nano)composite active particles with a carbon surface layer and particle size mostly in the range from around 0.5 to around 10 μm, 0.002-0.200 g SWCNT per g of polyvinyl alcohol (PVA) binder may be used. The value may be further increased by improving the affinity between binder and active particles, e.g., by functionalization of carbon particle surfaces, or by inclusion of a nonpolar binder constituent with a greater affinity for non-functionalized carbon surfaces.

Figure 3:
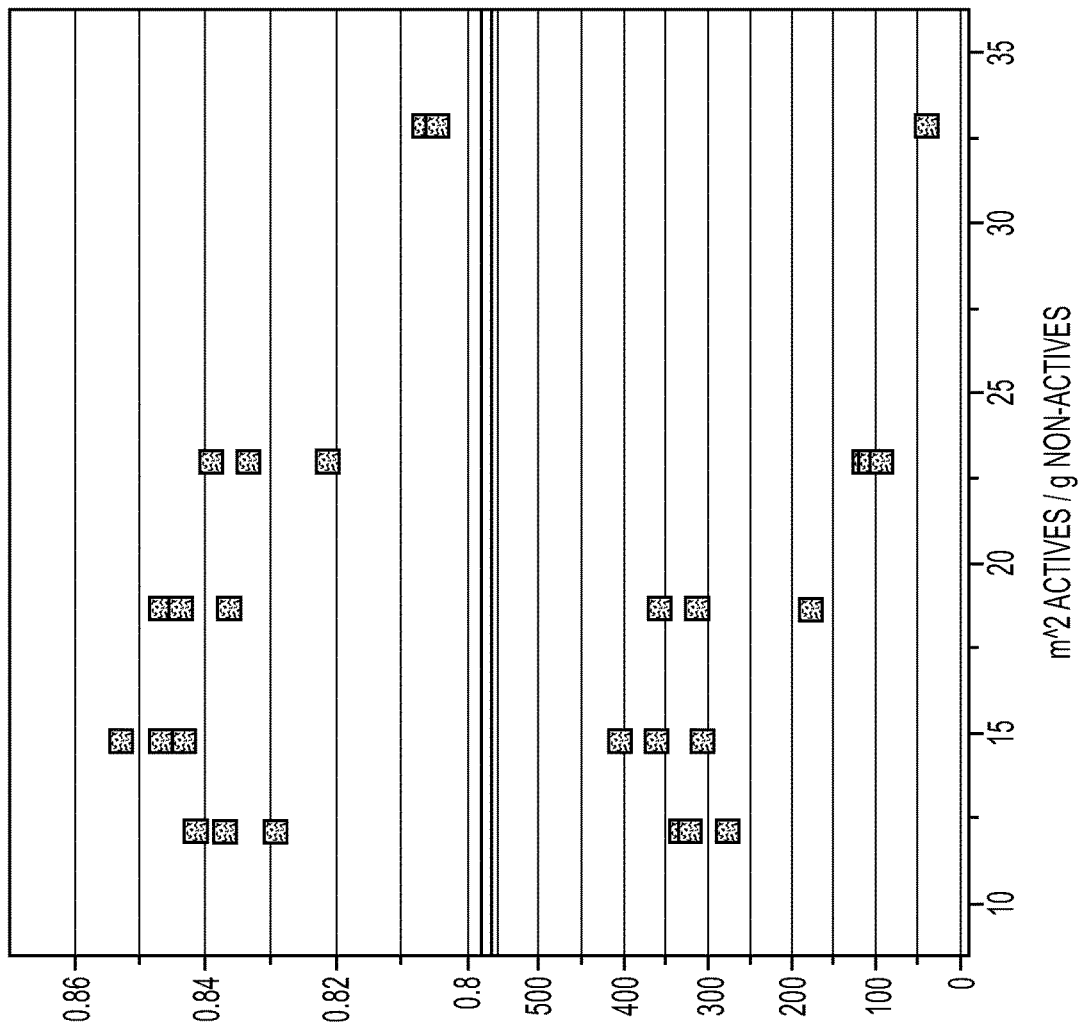

FIG. 3 illustrates an example of the impact of the ratio of the surface area of the active (nano)composite Si-comprising anode particles to the mass of inactive components (binder and conductive additives combined) on the formation efficiency (on a 0-1 scale, where 0.85 corresponds to 15% capacity losses during the formation cycles in combination with the capacity reduction upon increase in the charge-discharge rate from C/10 to C/2) and stability of full cells comprising such anodes and lithium cobalt oxide (LCO) cathodes. These (nano)composite Si-comprising anode particles experience moderately high volume changes during the first charge-discharge cycle and moderate volume changes during the subsequent charge-discharge cycles and an average size around 2.3 micron and specific surface area of around 4 m$^2$/g. In this example, an increasing amount of inactive (primarily composed of SWCNTs and a PVA binder) to the level above 20 m$^2$-active/g-inactives substantially reduces formation efficiency and cycle stability.

Figure 4:
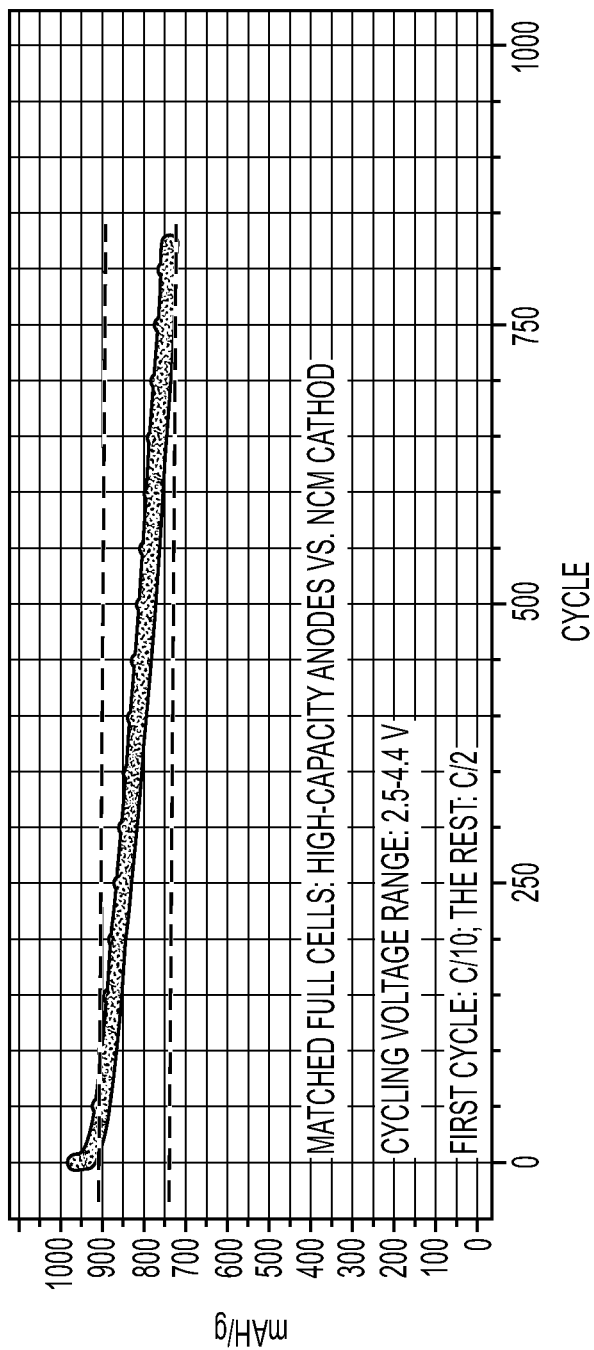

FIG. 4 illustrates good cycle stability (over 750 cycles to 80% of the initial capacity) achieved in matched full cells with NCM cathodes and high-capacity (nano)composite anodes which exhibit moderately high volume changes during the first charge-discharge cycle, moderate volume changes during the subsequent charge-discharge cycles and an average particle size of around 1.5 microns, as a collective result of the positive impact of using SWCNTs as conductive additives in addition to PVA binder in powders.

In some applications, it may be advantageous to induce an opposite charge on the surface of conductive additives and the (nano)composite electrode particles in order to enhance their contact area and contact strength and achieve more uniform mixing. For example, a positive charge may be introduced on the surface of the composite particles and a negative charge may be introduced on the surface of conductive additives. In another example, a negative charge may be introduced on the surface of the composite particles and a positive charge may be introduced on the surface of conductive additives. In some applications, it may be advantageous to induce a chemical reaction between conductive additives and the electrode particles during or after electrode drying.

In some applications, it may be advantageous to use more than one type of conductive additive. It may be further advantageous to chemically bond one type of conductive additive to the surface of electrode particles. In this case, the desired swell-resistant characteristic of certain binders as described in association with some of the embodiments above for maintaining stability of the electrode particle/conductive additive interface may be substantially reduced or even completely avoided. In one example, short (e.g., about 0.01-10 micron) carbon nanofibers, carbon nanotubes, or graphene/graphite ribbons may be grown from the surface of electrode particles (e.g., by using catalyst-assisted chemical vapor deposition, CVD, or other mechanisms). In another example a mixture of conductive carbon additive particles (e.g., carbon black, carbon nanotubes, etc.) with one charge and electrode particles with the opposite charge may be additionally mixed with a small sacrificial binder content and then carbonized. The carbonized binder may firmly and permanently attach some of the carbon additives to the surface of the electrode particles. Such electrode particles/carbon additives composites may be used in slurries with various suitable binders and additional conductive additives to form (or cast) more stable electrodes that experience moderate volume changes during cycling (e.g., as applicable in the context of one or more embodiments of the present disclosure).

In some applications, it may be advantageous to use two or more conductive additives with different surface charges or different surface chemistries. In particular, when one type of additive exhibits higher affinity to the electrode particles (e.g., the Si-comprising active material particles), such an additive may be selected to form a uniform coating around the electrode particles. Such an additive (e.g., a conductive carbon additive) may also be selected to form chemical bonds with the electrode particles at some stage of the electrode assembling or slurry preparation. The second additive (e.g., another conductive carbon additive) may be incorporated into the binder in significantly higher fraction than the first additive and thus be optimized for forming robust and uniform binder/additive (nano)composites that yield stable electrodes.

In some applications, two or more conductive additives may be selected to achieve different functions. In one example, one type of additive (e.g., with larger dimensions or higher conductivity) may be selected to provide higher electrical conductivity within the electrode as a whole, while the second type of conductive additive may be selected to ensure that each individual electrode particle is effectively electrically connected to multiple neighboring electrode particles and the first type of additive, thereby forming an efficient conductive network that results in high capacity utilization of the electrode material. In a specific example, at least one type of carbon particle in the conductive additive material may an average length of about 3 times to about 100 times larger than an average length of at least one other type of carbon particle in the conductive additive material. In another example one type of additive may be selected to perform multiple functions (e.g., to enhance both electrical conductivity and mechanical stability of the electrodes or to enhance electrical conductivity of the electrode and provide faster ionic pathways (e.g., if it is porous or if it prevents electrode pore closing)). One type of conductive additive may also assist in better dispersing the second type during the slurry mixing. In particular, it may be advantageous to use a mixture of two of the following types of conductive additives in the same slurry: (i) various types of single walled carbon nanotubes (SWCNTs) (with or without surface coatings); (ii) various types of doublewalled (DWCNTs) or multiwalled carbon nanotubes (MWCNTs) (with or without surface coatings); (iii) various types of carbon black (including those that are annealed at above 1000° C. in inert environment); (iv) various types of carbon fibers (including those that are annealed at above 1000° C. in an inert environment); (v) various types of carbon nanofibers; (vi) various types of metal nanowires (without or with protective or functional surface coating layers) (e.g., Cu, Fe, Ti, or Ni nanowires for low potential anodes in Li-ion batteries, such as Si comprising anodes; Al nanowires for cathodes or high voltage anodes in Li-ion batteries, or other nanowires (e.g., Ni or Ti nanowires) for various water batteries, etc.); (vii) various types of carbon-coated or metal- (e.g., Cu, Fe, Ni, Ti or Al, etc.) coated ceramic nanowires or fibers (e.g., $Al_2O_3$ nanowires or fibers); (viii) various types of carbon onions; (ix) various types of graphite ribbons (including metal-coated graphite ribbons); (x) various types of metal (e.g., Cu, Fe, Ni, Ti or Al, etc.) nanoparticles (with or without coatings by a protective or functional surface layer); (xi) various types of metal (e.g., Cu, Fe, Ni, Ti or Al, etc.) (nano)flakes (with or without coatings by a protective or functional surface layer), (xii) various types of metal carbide or metal nitride or metal carbonitride (nano)flakes or (nano) fibers (including those comprising Ti and other suitable transition metals), to name a few examples. The surface chemistry of each type of such additive may be individually optimized for optimum performance in cells.

In some applications, it may be advantageous to add salts into the slurry in order to (i) improve dispersion (mixing) of the components; (ii) control spacing between the electrode particles (e.g., if uniform but non-zero spacing is desired to reduce electrode-level volume changes during the first charge-discharge cycle and subsequent cycling—which may be achieved, for example, by the extracting/washing the salt from the dried and assembled electrode but prior to the electrode use in cells); (iii) control (e.g., reduce) solubility of the polymers in a slurry (e.g., in order to precipitate them faster during the drying of the electrode and thus reduce electrode shrinking during electrode drying); (iv) provide additional control in the interaction between the slurry components (electrode particles, additives, binders, etc.); (v) tune the interactions between the electrode (or additives or binders) with electrolytes; or (vi) serve other functions. Such salts may be washed away (extracted) from the electrode prior to its use (assembling) in cells. A broad range of salts may be used. Depending on the particular cell chemistry and electrolyte composition, illustrative examples may include, but are not limited to various alkali (e.g., Li, K, Na, Ca, etc.) metal salts (for example, various inorganic salts, such as LiCl, LiBr, LiI, $Li_2SO_4$, $LiNO_3$, $LiClO_3$, $LiClO_4$, $H_3BO_3$, $Li_3PO_4$, $Li_3O_3P$, $Li_4O_7P_2$, or $Li_3NO_3S$, among others, or various organic salts, such as Li salts of carboxylic acids (formic acid, acetic acid, propionic acid, butyric acid, sulfonic acids, valeric acid, caproic acid, oxalic acid, lactic acid, malic acid, benzoic acid, citric acid, benzenecarboxylic acid, carbonic acid, carbolic acid, hydroxymethanoic acid, etc.), of thiolic acids, uric acid, 2-aminoethanesulfonic acid, 4-methylbenzenesulfonic acid, trifluoromethanesulfonic acid, aminomethylphosphonic acid, to name a few suitable examples).

In some applications, it may be advantageous to restrict the overall volume fraction of all conductive additive particles within the electrode to less than 5 vol. % (even more preferably below 2 vol. %). By mass, the fraction of all conductive additive particles within the electrode may preferably be less than 7 wt. % (even more preferably below 3 wt. %) if only carbon materials are used as conductive additives and less than 10 wt. % (even more preferably below 5 wt. %) if some of the conductive additives comprise suitable metals. A higher volume fraction of conductive additives may reduce ionic transport and volumetric capacity of electrodes and may increase the extent of undesirable side reactions. A higher gravimetric (mass) fraction of conductive additives may reduce the specific capacity of the electrodes.

In some designs, it may be advantageous to use porous fibers (e.g., either conductive or non-conductive) in the electrodes and electrode slurry formulations. The pores in such fibers may be utilized for several functions. First, they may accommodate some of the stresses during the volume expansion of the volume changing electrodes (e.g., Si-comprising and others) by compressing, and thus improve electrode mechanical stability (and also reduce stresses on the metal current collectors). Second, they may be used to enhance ion transport from the surface of the electrode into its bulk, which may become particularly important for thicker electrodes or for electrodes that undergo initial expansion (and thus may reduce internal porosity for ion transport). In order to warrant their electrochemical stability they may be composed of (i) polymers; (ii) carbon; (iii) metals that do not undergo electrochemical alloying with Li (e.g., Ni, Cu, Ti, or Fe) at the electrode potentials experienced during cell operation (in cases when they are used in low-potential anodes for Li ion batteries, such as Si-based and the like); (iv) ceramic (oxides, nitrides, etc.) that do not exhibit conversion reactions with Li (such as aluminum oxide, zirconium oxide for anodes and many other oxides, nitrides, etc. for cathodes) at the electrode potentials experienced during cell operation (in cases when they are used in low-potential anodes for Li ion batteries, such as Si-based and the like). In order to warrant accurate cathode:anode capacity matching, such porous fibers may preferably be uniformly distributed within the electrode and be of moderate dimensions (e.g., a diameter of preferably less than 20% of the electrode thickness; even more preferably, less than 5% of the electrode thickness). The suitable length of such porous fibers may be in the range from around 20% of the electrode thickness to around 200 times the electrode thickness (most commonly from around 50% to around 10 times the electrode thickness). For 50-100 micron thick electrodes, this translates into a length from around 10 microns to around 2 cm in a broader case. The volume fraction of such porous fibers may range from around 0.01% to around 20% of the electrode volume (in some applications when thicker electrodes are used or when the volume expansion is relatively large in the "formation" cycles, from around 1% to around 20%). The pore fraction in such porous fibers may range from around 10 vol. % to around 97 vol. % (most preferably from around 30 to around 85 vol. %, depending on the mechanical properties of the fiber material). Smaller pore volume (pore fraction) may be ineffective for ion transport and stress accommodation, while larger pore volume may not allow these fibers to maintain sufficient mechanical integrity during the slurry and electrode formulations (including calendaring).

In some designs, it may be advantageous to use sacrificial fibers instead of porous fibers in the electrode slurry formulations. Such sacrificial fibers may be removed from the electrode (preferably after electrode calendaring or densification to maintain high volumetric capacity of the electrodes) by using solvents or by heat treatment (e.g., evaporation, carbonization, thermal decomposition, etc.) or by other mechanisms. If solvents are used for their removal, such fibers may comprise polymers or sugars or salts that may be easily dissolved by exposing the electrode to a solvent bath. The volume fraction and other properties of sacrificial fibers may be similar to that of the porous fibers. In some designs, pores formed in the electrodes using such sacrificial fibers may enhance rate electrode performance and also accommodate stresses within the electrode during the cell operation, resulting in enhanced cycle stability.

In some designs, it may be advantageous to use porous platelets or porous sacrificial platelets instead of fibers in the electrodes and electrode slurry formulations.

In some designs, it may be advantageous to attach porous or sacrificial platelets or fibers to the current collectors (e.g., vertically) prior to coating the current collectors with slurries. In the case of vertical attachment, these additional ion transport channels (pores) in the electrode may be oriented more perpendicular to the electrode and thus provide faster ion transport for some applications. Similarly, in some designs this "more perpendicular" orientation may be more effective in accommodating stresses within the electrodes.

In some designs, it may be advantageous to reduce electrode-level swelling by providing controlled spacing between the individual volume-changing composite particles. In some designs, such spacing may be relatively uniform within the electrode. The optimal value of such spacing may depend on the properties of the particles (e.g., value of the volume changes in first and subsequent cycles) as well as the properties of the binder. In most designs, the average inter-particle spacing may range from around 0.1% to around 60% of the characteristic size (e.g., diameter) of the volume changing electrode particles.

In some designs, collapsible (or sacrificial) slurry additives may be utilized in electrodes to control spacing between individual volume-changing (nano)composite particles and thus provide more room for these particles to expand into. In one example, hollow polymer spheres that get easily inelastically deformed (e.g., crushed or collapsed) by the expanding particles or may be dissolved (e.g., by the electrolyte or in a separate process before electrode punching) prior to lithiation. In another example, slurries or electrodes may comprise sacrificial (nano)particles of water or solvent-soluble organic or inorganic components (e.g., organic or inorganic salts, carbohydrates or other organic or inorganic components), which may be removed from the electrode prior to using them in cells. In some designs, these sacrificial components may form coatings around the volume changing (nano)composite particles.

In some designs, it may be advantageous to introduce grooves or pores (e.g., slit-shaped pores or cylindrical shaped pores or pyramid shaped pores, etc.) into the electrode to enhance its mechanical stability (to accommodate stresses induced during battery cycling, particularly to moderately large or large electrodes with lateral dimensions in the range of about 2 to about 2,000 $cm^2$ or particularly to moderate (e.g., about 2-4 $mAh/cm^2$) or high (e.g., about 4-12 $mAh/cm^2$) areal loading electrodes) or to enhance mechanical integrity (e.g., adhesion or cohesion) during bending (e.g., when bended electrodes are used in cell construction (e.g., in cylindrical cell or in a curved cell) or when electrodes could be flexed or bended during use in the form of single-layered or multi-layered pouch cells to a bending radius in the range from around 2.0 mm to around 100 mm). In some designs, it may be advantageous for at least a portion of at least one electrode (e.g., the anode, the cathode, or both) to be bent to a bending radius in the range from around 2.0 mm to around 40 mm during the cell manufacturing or during the cell use or integration in a device, in some designs, the presence of grooves (pores) in the electrode may help alleviate stresses in the electrode and enhance its mechanical stability and performance. The spacing between the grooves (pores) in the electrode may be regular (ordered, as, for example, forming a square or a rectangular pattern or a line pattern, etc.) and range from around 0.2 mm to around 2.0 cm (e.g., a spacing larger than 2.0 cm may not provide sufficient benefits for some designs, while a spacing smaller than 0.2 mm may undesirably reduce energy density or other properties of the cells in some designs). In some designs, the spacing may range from around 0.2 mm to around 10.0 mm (e.g., more preferably, from around 2.00 mm to around 10.0 mm). In some designs, the average thickness of the groove (width of the pore) may range from around 0.02 mm to around 2.00 mm (in some designs, from around 0.05 to around 1.00 mm). In some designs, smaller than 0.02 mm thicknesses of the grooves may be technologically difficult or expensive to achieve and, in addition, smaller thicknesses may not provide enough volume for stress accommodation during battery cycling or electrode bending. In some designs, the grooves (or pores) may propagate from the top of the electrode surface to around 100% of the electrode thickness (all the way from the top of the electrode to the current collector foils). In other designs, the grooves (or pores) may propagate from the top of the electrode surface to around 30.0-99.0% of the electrode thickness. In other designs, the grooves (or pores) may propagate from the top of the electrode surface to around 50.0-100.0% of the electrode thickness. In some designs, the grooves (or pores) may form a wedge with larger groove (pore) width (or diameter) near the electrode top surface and smaller groove (pore) width (or diameter) deeper into the electrode. In some designs, such grooves or pores in the electrodes may be induced during calendaring (electrode densification) (for example, by using specially designed calendaring surfaces with (e.g., regular/ordered) protrusions instead of the typically used smooth calendaring surface). In some designs, such grooves or pores in the electrodes may be induced before calendaring by using mechanical means or laser micro-machining. In some designs, such grooves or pores in the electrodes may be induced after calendaring by using mechanical means or laser micro-machining. In some designs, such grooves or pores in the electrodes may be induced be depositing sacrificial protrusions onto the current collector surfaces and removing them after electrode casting or calendaring. In some designs, electrodes together with the current collector foils may be perforated (comprise through pores/holes of, for example, cylindrical shape) to enhance their mechanical properties or rate performance or provide other benefits. In some designs, only the current collector foils may be perforated.

Figure 5:
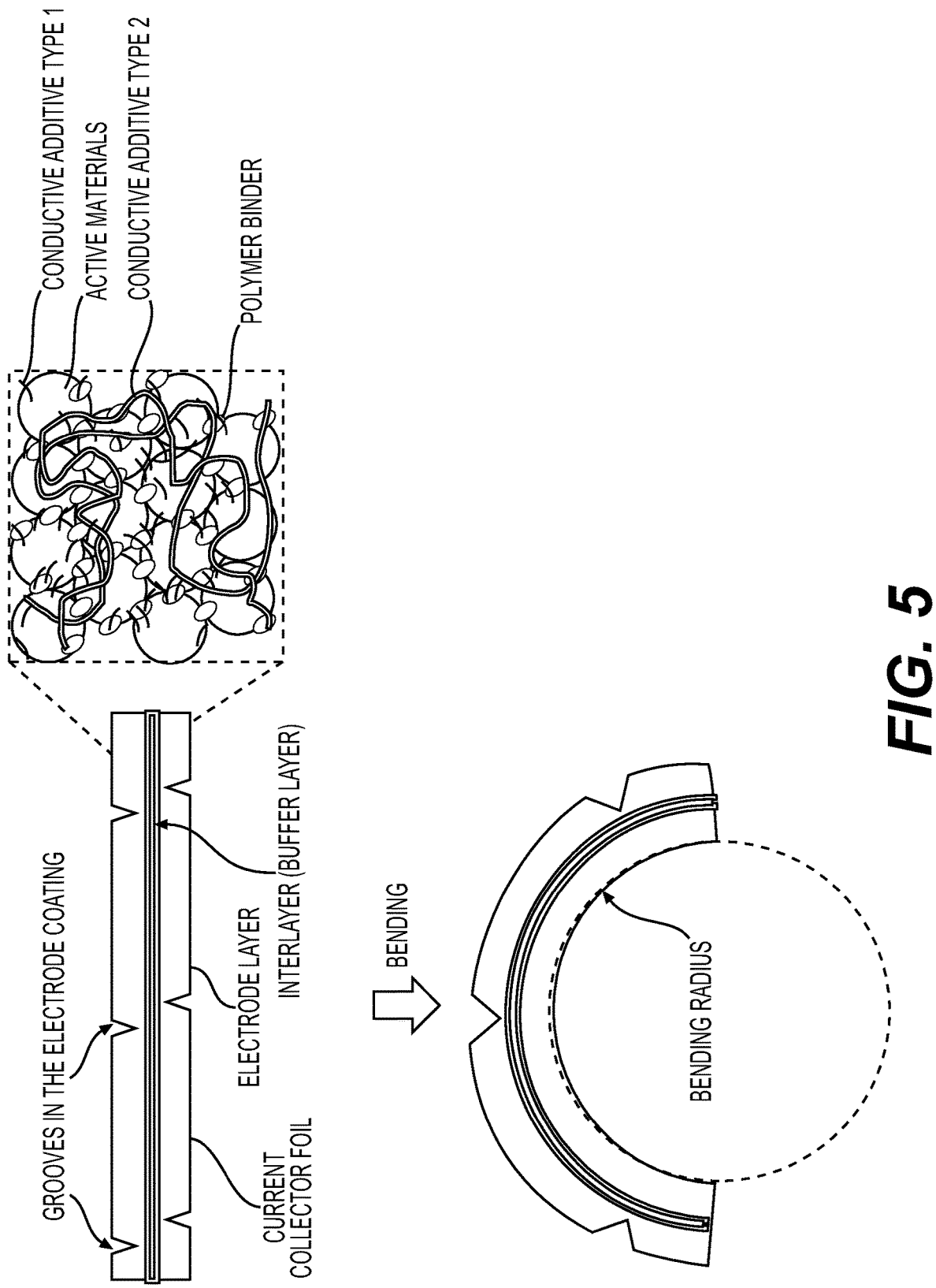
FIG. 5 illustrates an example of schematics of an electrode with regular grooves for enhanced mechanical stability during bending in accordance with an embodiment.

FIG. 5 illustrates simplified schematics that show an example of how grooves (e.g., pores of various shapes and sizes) in the electrode may reduce tensile and compressive stresses in the electrode during bending or flexing (e.g., by expanding or contracting the groove sizes). In this example (for illustrative purpose only), the electrode comprises active particles, two types of conductive additives and an interlayer between a current collector foil and an electrode layer.

In some designs, it may be advantageous to have a conductive (e.g., polymer or polymer-carbon composite or polymer-metal composite) interlayer between the electrode and current collector foils (which one may also call "buffer layer"). Not only may it enhance rate performance of the electrode with volume-changing (nano)composite electrode particles, but more importantly the buffer layer may significantly enhance electrode stability in some designs. Such an interlayer may be particularly advantageous for electrodes comprising (nano)composite particles exhibiting larger volume changes. Such an interlayer may further be advantageous for electrodes produced at medium-to-high capacity loading (e.g., about 2.0-12 mAh/cm$^2$). Such an interlayer may be particularly advantageous for relatively thin current collector foils (e.g., foils with an average thickness from around 4 µm to around 15 µm). The use of both higher capacity loadings and thinner foils may be advantageous in some designs because such design approaches increase energy density of the cells. In some designs, without a buffer layer, the volume changes in the electrode (at both the first charge-discharge cycle and subsequent charge-discharge cycling) may induce significant stresses within the foils, which may eventually lead to its mechanical failure. Similarly, such volume changes may also lead to separation of at least portions of the electrodes from the current collector foils. Unfortunately, higher capacity loadings may induce larger stresses at both the electrode/foil interface and, in some cases, within the foil and, thus, lead to mechanical failure(s) in some designs. If such stresses exceed some critical value related to the electrode/foil adhesion strength, the electrode may delaminate from the foil after a certain number of charge-discharge cycles. The use of a conductive interlayer may significantly reduce stress concentration and additionally improve electrode adhesion in some designs. Therefore, the conductive interlayer may effectively prevent the delamination and improve cell cycle stability to acceptable values in some designs. In some designs, the strain and stresses within the electrode may effectively translate into the (cycling) strain and stresses within the current collector foils in some designs. Thinner foils may not exhibit sufficiently high strength, sufficiently high maximum strain or sufficiently good fatigue resistance and, thus, form cracks and fractures during cycling, leading to premature cell failure in some designs. The use of a conductive interlayer between the electrode and current collector foils may absorb some of the stresses, thereby reducing stresses within the foil and effectively preventing (or significantly delaying to an acceptable value) foil failure in some designs. In some designs, the interlayer may also substantially increase adhesion between the electrode and current collector foils. This may become particularly important in case of smoother foils (e.g., in case of foils produced by rolling (roll-thinning) rather than electrodeposition), higher capacity loadings (e.g., typically higher than around 3.5 mAh/cm$^2$) and/or higher volume changing composite particles.

Such an interlayer may comprise solid particles (e.g., conductive solid particles, such as conductive carbon particles, among others), polymeric binder (which may be a uniform polymer or a copolymer or mixture of several polymers or co-polymers) and pores. The polymer binder may be electrically conductive or electrically insulative. Its mechanical properties may be optimized for a particular electrode design.

The suitable fraction of electronically conductive materials within the interlayer may range from around 0.1 wt. % to around 100 wt. %. For some applications, it can be important though that the interlayer remain electrically conductive even when a small fraction of conductive materials is utilized (so that electrical percolation of conductive particles is achieved within the interlayer). Solid particles may exhibit a near-spherical or elliptical shape (e.g., as some carbon black powders), irregular shape, be planar (two dimensional, 2D) (e.g., as graphite flakes or carbide flakes or nitride flakes or carbonitride flakes, etc.) or be elongated (one dimensional, 1D) (e.g., as carbon nanotubes or carbon fibers or metal nanowire or nanofibers or carbide or nitride or carbonitride fibers, etc.). The average smallest dimension of the solid particles (diameter or thickness) may range from around 0.3 nm to around 5 microns (more preferably from around 1 nm to around 300 nm). In the case of 1D and 2D solid particles, the average largest dimension of the solid particles (average length of the (nano)fibers, (nano)wires, (nano)tubes, or average diameter of planar particles) may range from around 10 nm to around 5,000 µm (in some designs, more preferably from around 200 nm to around 30 µm). Planar or elongated (2D or 1D) particles with larger length may be challenging to coat/deposit on a foil for certain applications.

Figure 6:
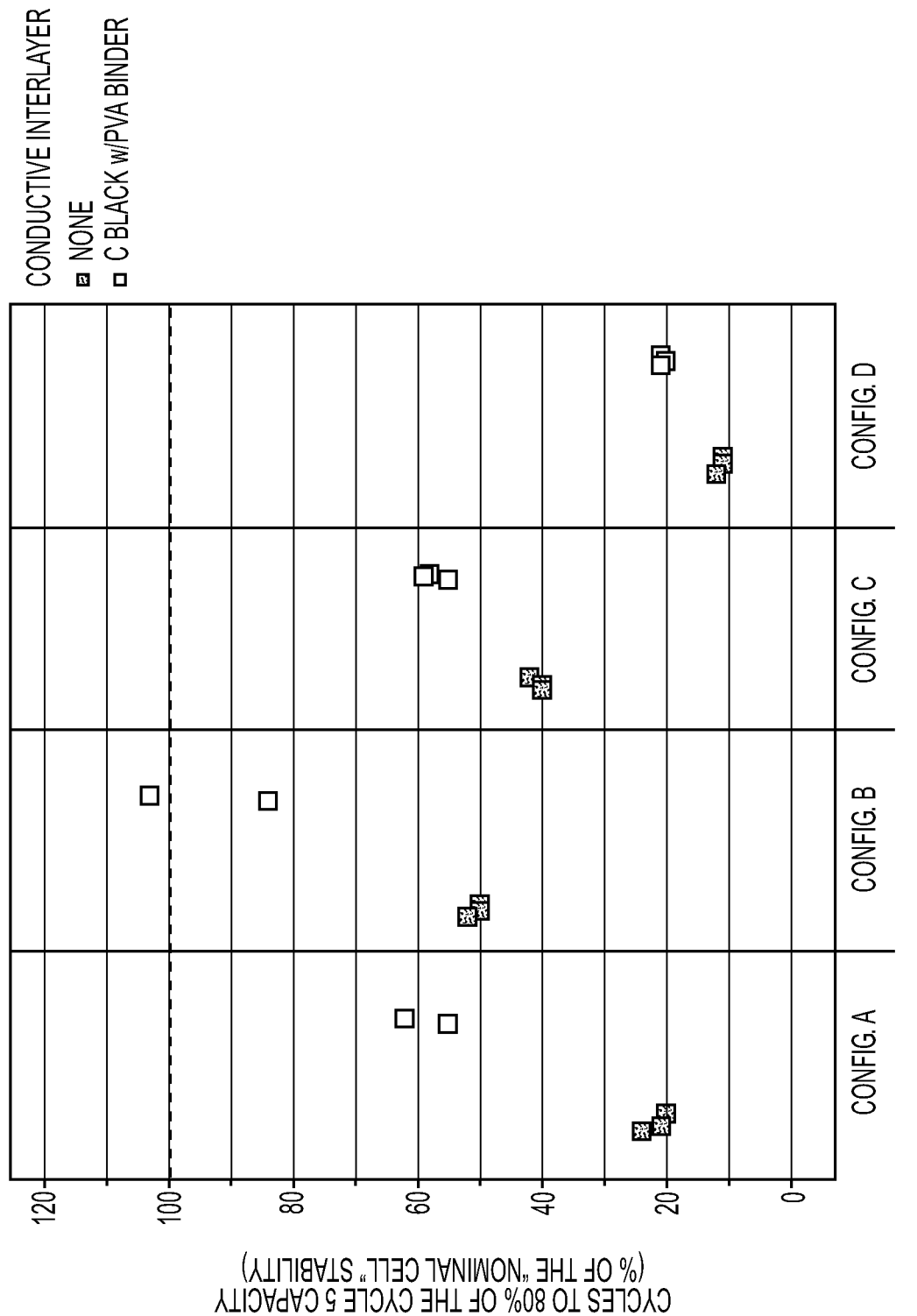

FIG. 6 illustrates the impact of the interlayer between Cu foils and the anode on the stability of full cells with volume changing (nano)composite Si-comprising high capacity loading anodes and LCO cathodes. The interlayer in this example comprised primarily carbon black particles (33 wt. %) and a PVA polymer (67 wt. %). Configurations A through B correspond to different anode compositions (e.g., with or without certain functional groups on the anode particles, slightly different amounts of inactive materials, etc.). In configurations A, B and C the (nano)composite Si-comprising volume changing anode particles have an average diameter of around 3.7 microns, while in configuration D the (nano)composite Si-comprising volume changing anode particles have an average diameter of around 8.5 micron. In all tested configurations, the interlayer presence substantially improves cycle stability.

Figure 7:
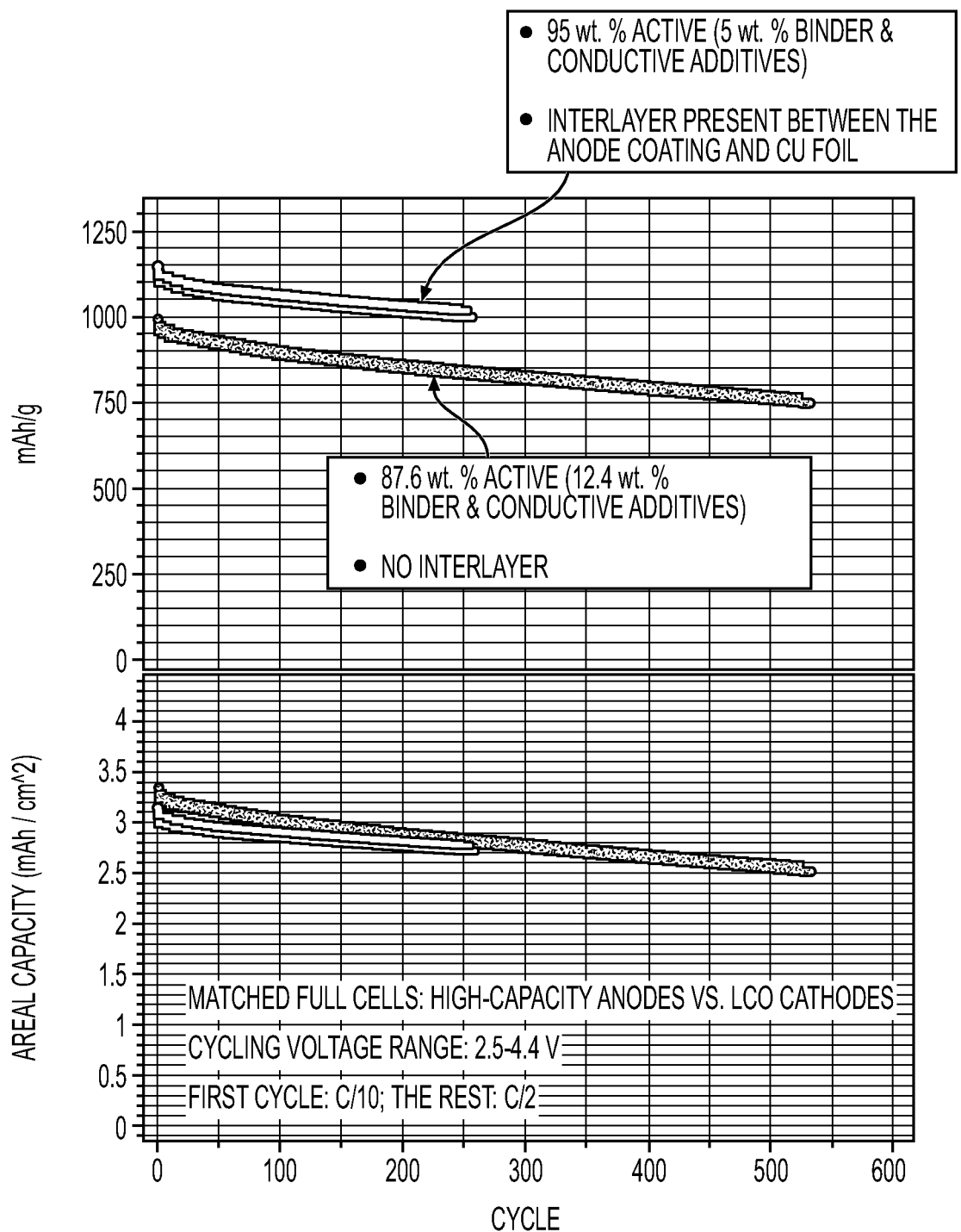

FIG. 7 illustrates the positive impact of using a combination of (i) the interlayer between the Cu foils and the anode, (ii) reduced content of inactive materials (down to 5 wt. % of binder and conductive additives combined in the electrode coating; up to 95 wt. % of active materials), (iii) using carbon nanotubes as conductive additives in the electrode on improved cycle stability achieved in matched full cells with LCO cathodes and high-capacity (nano)composite anodes which exhibit moderately high volume changes during the first charge-discharge cycle, moderate volume changes during the subsequent charge-discharge cycles and an average particle size of around 1.5 microns.

In some designs, the use of mechanically strong 2D and 1D nanomaterials within this interlayer improves its mechanical properties and thus may be particularly effective for cell stability improvements. 1D materials may additionally provide simplicity for the interlayer fabrication because they may be easier to disperse or intermix with other components of the interlayer. The suitable fraction of such 1D nanomaterials in the interlayer may depend on the particular electrode design and may range from around 0 wt. % to around 100 wt. %. Suitable examples of 1D materials include, but are not limited to single walled carbon nanotubes (SWCNTs), double-walled carbon nanotubes (DWCNTs), multi-walled carbon nanotubes (MWCNTs), carbon (nano)fibers, suitable (compatible with the electrode) metal (nano)wires, (nano)tubes and (nano)fibers (for example, copper, iron, nickel, or titanium or their alloys for Li ion battery anodes; aluminum or nickel for Li-ion battery cathodes), suitable (compatible with the electrode) ceramic nanowires or nanofibers (for example, nanowire or nanotube or nanofibers comprising aluminum oxide, zirconium oxide, magnesium oxide, and other oxides; titanium nitride, boron nitride, various other nitrides; titanium carbide, titanium nitride and various other suitable ceramic materials), suitable polymer or organic (nano)fibers, various structural composite and core-shell (nano)fibers, (nano)wires and nanotubes, etc. These 1D materials may be conductive or may be insulative. Higher electrical conductivity may be advantageous for achieving higher power performance and better electrical connectivity between the electrode and the current collector foil in some designs. However, electrolyte may decompose on electrically conductive particles. Therefore, there may be an optimum composition of electrically conductive and electrically insulative particles for particular applications. In some designs, electrically conductive particles may primarily serve to add electrical conductivity to the interlayer. In other designs, they may serve to additionally provide mechanical reinforcement and absorb some of the mechanical loading of the electrode on the foil. Insulative particles may be primarily added to enhance mechanical stability of the foil-interlayer-electrode (for a one-sided electrode) or the electrode-interlayer-foil-interlayer-electrode (for a two-sided electrode) system during cycling. In some designs, a combination of different solid particles within the interlayer may be advantageous. In some designs, it may be advantageous for at least one type of the solid particles to exhibit a 1D shape.

In some designs, it may be advantageous for this conductive interlayer between the electrode and current collector foils to be composed of several sub-layers of distinct composition or to exhibit a gradual change in composition. In one example, the type of the binder or the amount of the binder may be different at the interface with the metal foil and at the surface of the coating layer. In another example, the type of the conductive additive(s) or the amount of conductive additives may be different at the interface with the metal foil and at the surface of the coating layer. When more than one sub-layer is used for the interlayer formation, different solvents may be utilized for the deposition of each sub-layer. In some designs, it may be advantageous for the sub-layers to be of different thickness for optimal performance.

In some designs, one or more of the polymer binders described above for the electrode may also be used in the interlayer composition. In some designs, the composition and properties of the binder in the electrode and the interlayer may be very similar or even identical (e.g., to ensure good adhesion). In some designs (e.g., when more than one polymer is used as a binder in the electrode), it may be advantageous for the interlayer to comprise at least one of such polymer binders. In some designs though, it may be advantageous for the electrode and the interlayer to exhibit slightly different properties (e.g., have a more elastic binder in the electrode and have a stronger adhering binder in the interlayer). In some designs, it may be advantageous to form chemical bonds between the interlayer and the electrode binder. In some designs, approaches and chemistries identical or similar to that previously described for the formation of bonds between the binder and composite active material particles may be utilized. In some designs, chemical bonds between the binder in the electrode and the binder in the interlayer (buffer layer) may be formed (e.g., as for the copolymer formation). In some designs, such bonds may be formed during electrode drying.

In some designs, it may be advantageous to add functional groups (or a substantially thin, e.g., about 1-5 nm in average thickness, layer of an organic component, such as a polymer) onto the surface of metal foil current collectors in order to: (i) improve adhesion of the electrode (or the conductive interlayer), (ii) improve electrode slurry wetting (or wetting of the pre-deposited conductive interlayer slurry), or (iii) achieve preferential adsorption of the components of the slurry (or components of the conductive interlayer slurry) at the interface with the metal for improved electrode performance (improved stability, improved rate, etc.). In some designs, such functional groups (or a thin polymer layer) may be used to chemically bond the (electrode or interlayer) binder or the conductive additives or the active particles to the current collector foils. Such functional groups may be added by using solution-based chemistry or by using dry chemistry methods (such as plasma, ultra violet (UV)-treatment, ozone treatment, exposure to reactive gases, etc.).

In some designs, another material layer (which may also be referred to herein as a type of "interlayer") may be infiltrated (e.g., deposited on the top of) the electrode to directly contact the separator in a battery stack. Such an interlayer may be particularly advantageous if one needs to reduce vertical (in-plane) electrode swelling and improve electrode mechanical properties for cell stability improvements. Similar to the above-described case, the use of mechanically strong 2D and 1D nanomaterials (graphene, graphite flakes, graphite ribbons, flakes and sheets of various ceramic materials including nitrides, chalcogenides and others, SWCNTs, DWCNTs, MWCNTs, carbon (nano)fibers, suitable (compatible with the electrode) metal (nano)wires and (nano)fibers, suitable (compatible with the electrode) ceramic nanowires or nanofibers (for example, nanowire or nanofibers comprising aluminum oxide, zirconium oxide, magnesium oxide, and other oxides; titanium nitride, boron nitride, various other nitrides; various other suitable ceramic materials), suitable polymer or organic (nano)fibers, various structural composite and core-shell (nano)fibers, (nano)wires and nanotubes, to provide a few examples) within such a layer (interlayer), may be advantageous. In some designs, an interlayer at the metal current collector—electrode interface may be advantageously used in combination with another layer (interlayer) deposited on the top electrode surface. In other designs, the interlayer (top or bottom) may also be used to reduce resistance to sliding of the [electrode-separator-electrode] stack(s) upon bending of the pouch cells (e.g., in applications or during cell assembling). In this case, the amount of binder may typically be smaller (e.g., from around 0.1 wt. % to around 65 wt. % of the interlayer composition) and in some designs, the binder in the interlayer may preferably be sufficiently deformable (e.g., exhibit maximum elongation of above around 4.0%) and sufficiently soft.

It will be appreciated that, in the forgoing discussion, the "electrode" layer is separately described from the interlayer and the metal foil current collector. However, in some other examples, the electrode may be understood as a combination of all the components, including the foil and the interlayer.

The suitable average thickness of the interlayer may range from around 5 nm to around 10 µm. In some designs, it may range even more preferably from around 50 nm to around 1 µm. In some designs, substantially larger thicknesses of the interlayer may reduce the energy density of the cell to an undesirably low level and, in some cases, may increase first charge-discharge cycle losses. In some designs, lower thicknesses of the interlayer may be insufficient for providing the desired enhancement in performance. The optimum thickness of the interlayer may also depend on the particular electrode and cell designs as well as the interlayer composition and properties.

In some designs, exposure of the metal foil current collector to a cathode material in its oxidized state may lead to corrosion of the current collector. An interlayer may prevent direct contact between the active cathode material and the current collector, preventing corrosion. If the active material or its derivatives are soluble in electrolyte or the dispersant used in the electrode slurry, it may be desirable for the interlayer to be comprised of a polymer that is not swellable or soluble in either the electrolyte or the slurry dispersant. In this case, the interlayer may provide a physical barrier that high-chemical-potential soluble compounds cannot permeate.

In some designs, a layer of carbon film may be deposited on metal current collector foils (e.g., Cu or Ni or Ti or stainless steel or Al, etc.) to improve electrode performance (in some examples, to improve stability upon contact with electrolyte; in other examples, to reduce electrical resistance, in yet other examples—to improve corrosion resistance or mechanical stability of the current collector). In some designs, such a carbon layer may be deposited using physical vapor deposition (PVD; e.g., by sputtering or evaporation, etc.) or chemical vapor deposition (CVD). In some designs, CVD may be plasma-enhanced (e.g., in order to increase the deposition rate or reduce the deposition temperature). In the case of CVD, carbon may be deposited using precursors including, but not limited to: acetylene, propylene, ethylene, methane, hexane, cyclohexane, benzene, xylene, naphthalene, anthracene, to name a few. In some designs, a two-stage process may be employed, wherein conditions for the initial surface layer are tuned to form a high quality C/metal foil interface and a second stage is utilized for rapid deposition of the remainder of the carbon film. In one illustrative example, the first stage is selected to grow graphene on metal (e.g., Cu) foil. As an example, low pressures (e.g., less than 100 Torr) and high temperatures (e.g., from around 700 to around 1050° C. or slightly below a melting point of the corresponding metal) may be used, with the time adjusted to grow, for example, 1-10 graphene layers (with the understanding that too many layers may reduce conductivity and induce delamination during cooling). The second stage may be tuned for rapid deposition of carbon while avoiding gas-phase nucleation of carbon particles (the conditions for which depend on the particular precursor).

In some designs, carbon nanotubes (CNTs) or vertical graphene ribbons or carbide or nitride or carbonitride fibers or ribbons may be grown on a metal current collector foil surface for improved performance. In some examples, metal catalyst nanoparticles (e.g., Fe, Ni, Co, Pt, Pd, Cu, Mn, Mo, Cr, Al, Au, Mg, Sn, etc.) may be deposited on a foil surface, followed by carbon (or carbide or nitride or carbonitride) deposition using precursors, such as acetylene, propylene, ethylene, methane, hexane, cyclohexane, benzene, xylene, naphthalene, anthracene, or others.

The suitable length of CNTs or graphene ribbons or carbide or nitride or carbonitride fibers or ribbons may range from around 50 nm to around 10 µm, to allow for sufficient flexibility and interaction with active particles, without adding too much volume to the current collector.

In some designs, it may be advantageous to use only a certain type of metal foils in combination with the above-discussed volume-changing electrodes (electrodes comprising the nanocomposite electrode materials (for example, conversion-type and alloying-type material comprising particles) that experience certain volume changes during cycling (for example, moderately high volume changes (e.g., about 8-180 vol. %) during the first charge-discharge cycle and/or moderate volume changes (e.g., about 5-50 vol. %) during the subsequent charge-discharge cycles) and an average size in the range from around 0.2 to around 20 microns). Such metal foils may be selected based on their mechanical (and, sometimes, electrical) properties. In particular, in some designs it may be advantageous for the foil to sustain mechanical elongation of at least about 3% prior to fracture. In some designs, it may be advantageous for the foil (e.g., roll-thinned metal foil) to sustain 1,000 loading-unloading cycles at mechanical elongations of at least 0.5% (even more preferably 1%) prior to fracture. In some designs, it may be advantageous for the foil to exhibit average grain size in excess of approximately 0.25 µm (more preferably, in excess of 2 µm). In some designs, it may be advantageous for the foil to exhibit average grain size between approximately 0.4 µm to approximately 400 µm. In some designs (e.g., if sufficient elongation may be achieved), it may also be advantageous for the foil to be a metallic glass. In some designs, it may be advantageous for the foil to comprise less than 0.1 at. % oxygen. In some designs, it may be advantageous to for the commercial foil to be annealed in a reducing environment (e.g., in an $H_2$-containing or hydrocarbon-gas (e.g., methane, acetylene, propylene, etc.) containing environment) to enhance grain size and reduce oxygen content. In some designs, it may be advantageous for the foil to be perforated (comprise holes) in order to enhance its mechanical stability (resistance to crack propagation during cycling). In some designs, the fraction of holes may range from around 0.01% to around 30%. In some designs, the suitable diameter of the holes may range from around 20 nm to around 20 µm. In some designs, the metal foils may comprise mechanical reinforcement additives (such as various 1D additives, including but not limited to various ceramic (e.g., aluminum oxide, zirconium oxide, silicon oxide, magnesium oxide, copper oxide, other metal oxides, various metal nitrides, carbon, etc.) nanowires, nanotubes and nanofibers). In some designs, current collector foils may advantageously comprise internal (closed) pores. In some designs, current collector foils may advantageously comprise open pores. The characteristic average size (e.g., diameter or width) of the pores may range from around 5 nm to around 5 µm. The average total pore fraction may range from 0 to around 75 vol. %.

Copper (Cu) foils are traditionally used as anode current collectors in low potential anodes (such as those based on graphite or Si-graphite mixtures or other low-potential anodes). However, in the context of one or more embodiments of the present disclosure, such current collectors may experience undesirable volume changes and, in some cases, fractures during cycling (particularly during the initial so-called "formation" cycles) due to the volume-changing nature of the high-capacity (nano)composite anode particles that adhere to the current collectors. At the same time, in some designs, it may also be undesirable for the current collector foils to expand significantly (e.g., by more than about 1-6% in each dimension) due to stresses in the electrodes. As such, it may be advantageous to utilize foils with higher hardness, higher elastic modulus and higher fracture toughness than typical Cu foils used in most commercial cells. Other metals, such as nickel (Ni), titanium (Ti), iron (Fe), steel (including stainless steel), vanadium (V), their alloys as well as Cu-rich (e.g., about 85-99.8 at. % Cu) alloys, etc., exhibit better mechanical properties (such as higher strength, higher fracture toughness, higher resilience to creep and fatigue, to name a few). Such alternative metals may be more difficult to produce in a thin foil form (e.g., about 5-20 µm) and may be more expensive. In addition, such alternative metals may exhibit lower electrical conductivity. For various reasons, such materials are never used in conventional commercial Li-ion battery cells as anode current collectors. However, in the context of one or more embodiments of the present disclosure, in some designs, it may be advantageous for the anode current collector foils to comprise Ni, Ti, Fe, or other metals or Cu alloys (instead of pure Cu) to achieve the desirable performance and mechanical stability. In some designs, such anode current collector foils may be thin (e.g., about 5-20 µm) and comprise about 5-100 wt. % of Ti, Ni, Fe. In some designs, it may be also be advantageous to produce thin (e.g., in the range from about 0.01 to 3 µm) coatings of copper (Cu) on the surface of Ni, Ti, Fe, or carbon-based foil (or mesh or foam) current collectors. The deposition of Cu may be conducted by electrodeposition, sputtering, or other suitable methods. In some designs, the layer of Cu may provide the following benefits: (i) advantageously improve adhesion to the electrode; (ii) advantageously improve electrical conductivity; and (iii) advantageously improve welding of the tabs, among other benefits. In some designs, the strength and mechanical properties of Cu foils may be enhanced be utilizing Cu alloys comprising Ni, Fe, Ti, Mg, or other suitable elements (that preferably exhibit minimal alloying with Li at low electrochemical potentials) in amounts exceeding approximately 2 wt. %.

In some designs, the strength and mechanical properties of the anode current collectors as well as adhesion to the electrodes may be enhanced by incorporating mechanically strong carbon or metallic (e.g., Ni, Fe, Ti, and other metals and metal alloys, including Cu) or ceramic (e.g., oxides, nitrides, carbides, etc.) (nano)fibers or nanotubes or nanowires or flakes into the bulk of the current collectors or depositing such fibers or nanotubes or nanowires or flakes onto the surface of the anode current collectors. In some designs, nonwoven or woven fabrics comprising carbon or metal (e.g., Ni, Fe, Ti, and other metals and alloys) or ceramic (e.g., oxides, nitrides, carbides, etc.) (nano)fibers or nanotubes or nanowires may impregnated with Cu or Cu alloys for use as anode current collectors. In some designs, the average thickness of such composite current collectors may range from around 3 to around 25 microns. Smaller thickness may not be sufficient to provide the required mechanical strength or conductivity for certain applications, while larger thickness may undesirably reduce the volumetric or gravimetric energy density of cells and increase their cost to impractical levels for certain applications.

A majority of commercial foils (e.g., Cu foils) used in certain commercial cells (e.g., with graphite anodes) are typically produced by electrodeposition. These may exhibit crystalline grains oriented perpendicular to the foil orientation (sometimes referred to as 'column-shaped grains") and/or may exhibit limited maximum elongation and fracture toughness. In some designs, however, foils produced by rolling (e.g., pressure-rolling) may be advantageous for use with the described electrodes with volume changing particles because they may exhibit higher strength, higher fracture toughness and better fatigue resistance. Such foils may advantageously exhibit grains (e.g., crystalline grains) that are flattened (or elongated) in the direction parallel to the plane (or surface) of the foil. In some designs, an average aspect ratio of such grains may advantageously exceed 2.0 (e.g., be in the range from around 2.0 to around 1000.0). In some designs, an average size (e.g., length) of the grains in the plane of the foil may range from the around 0.2 micron to about 4,000 microns. In some designs, the rolled foils (alternatively referred to as "roll-thinned metal foils") may be annealed prior to use to reduce the amount of built-in stresses, increase average grain size and/or increase ductility of the foils. Rolled foils, however, may suffer from low surface roughness and, as a result, may have weaker adhesion to the electrode. In some designs, it may be advantageous to use rolled foils that comprise a top/surface layer. In some designs, the layer may exhibit similar or the same metal composition as the bulk/center portion (or sub-surface part) of the rolled foils. Such a top/surface layer may be deposited by electrodeposition or other means on the rolled foils or produced by etching or laser micromachining or mechanical or other means in order to enhance surface roughness of the current collector so as to increase adhesion to the electrode surface. The desired range of thicknesses for such a layer may range from around 50 nm to around 20 micron (e.g., on each side of the foil). In some designs, the desired surface roughness of this surface layer (and the overall current collector foil) may be in the range from around 20 nm to around 10,000 nm root mean square (RMS) when measured on a 0.0001-1 mm$^2$ surface (e.g., around 1 micron RMS), depending on the electrode properties, electrode thickness and the possible use, composition and/or properties of the interlayer. In some designs, the geometrical shape of the protrusions or the surface roughness features may be elongated (e.g., as in 1D or 2D) or 3D (e.g., particle-shaped bumps) or dendritic or random or complex, may also be in the shape of craters, grooves, scratches, etc. The top/surface layer(s) may contribute somewhere from around 1.0 wt. % to around 50 wt. % of the total metal foil mass. In some designs, a larger mass fraction (e.g., about around 50 wt. %) may undesirably reduce foil mechanical properties. In some designs, this top/surface layer(s) may also comprise particles (including 1D or 2D particles or dendritically-shaped particles) to further enhance roughness or adhesion or improve mechanical or charge transfer properties or provide other benefits to cell designs. In some designs, the combination of using rolled foils with interlayer may be particularly advantageous. In some designs, it may also be advantageous to roughen the rolled foils by mechanical means or to induce holes into the rolled foils. In a further example, in some designs, at least a portion of the roll-thinned metal foils in the current collector is chemically bonded to the polymer binder in the anode electrode or an interlayer located between the roll-thinned metal foils and an active electrode layer. In some designs, the top/surface layer(s) may comprise a material composition that is different than a material composition of a sub-surface foil part of the rolled foils, e.g., to provide higher conductivity and/or chemical stability at a surface part of the rolled foils relative to the sub-surface foil part. Further, in some designs, the above-noted top-surface layer(s) may be arranged on one or more foils of the anode, the cathode, or a combination thereof.

In some designs, some of the conversion-type cathodes may similarly benefit from replacing Al by Al-rich alloys (e.g., about 85-99.5 at. % Al), Ti or Ni (or their alloys) current collector foils (or meshes or foams). In this case, in some designs, it may be advantageous for these current collectors to be coated with a thin (e.g., in the range from about 0.01 to about 3 µm) layer of Al in order to achieve higher electrochemical stability, higher conductivity, or, sometimes, better adhesion of the electrode or better welding or other useful properties. In some designs, the strength and mechanical properties of the cathode current collectors as well as adhesion to the electrodes may be enhanced by incorporating mechanically strong carbon or metallic or ceramic (nano)fibers or nanotubes or nanowires or flakes into the bulk of the current collectors or depositing such fibers or nanotubes or nanowires or flakes onto the surface of the cathode current collectors.

In some designs, it may be advantageous to pre-lithiate the electrode prior to electrode punching and cell assembling (in order to expand the electrode for better area matching with the counter-electrode).

In some designs, it may be preferable to apply calendaring (densification) to electrodes in order to form the colloidal crystal structure and reduce porosity in the electrodes. In some designs, it may be preferable to use less than about 10 vol. % (in some cases less than about 5 vol. %) of the binders and conductive additives (combined) in such electrodes. Larger quantities of the binder (that may precipitate at the contact points between particles) and conductive additives may limit the mobility of settling particles and also induce blockages of the ion transport through the electrode during cycling.

In some designs, it may be advantageous to utilize low molecular weight (MW) polymers (e.g., polymers with a MW less than around 25,000 Da) as binders (or as porous fibers or sacrificial fibers and platelets) because such polymers are more readily deformable during calendaring (densification), exhibit higher solubility in solvents (e.g., slurry solvents) and typically produce less foaming during slurry mixing (particularly in water-based slurries). Lower mechanical stability and higher swelling of such polymer binders may be countered later by cross-linking and chemical linking to active particles and current collectors.

In some designs, it may be advantageous to modify the porosity of the electrode. For example, the electrode may be fabricated so as to have a lower electrode layer (near a current collector) that exhibits a higher porosity (lower density; e.g., by only containing monodispersed particles or by containing porous filler particles or sacrificial particles in the shape of a sphere, a fiber, a plate, etc.), while a higher electrode layer (near a surface/separator) exhibits lower porosity (e.g., by also containing smaller particles that fit into interstitial positions in colloidal crystal structure, etc.). In this case, stresses near the current collector foils may be reduced (during the formation cycles), which may benefit cell stability and reduce undesirable current collector (e.g., foil) expansion or fracture. Such an approach has also been found to improve maximum rate performance (for a given volumetric capacity), in some designs.

The nanocomposite particles may generally be of any shape (e.g., near-spherical, cylindrical, plate-like, have a random shape, etc.) and of any size. The maximum size of the particle may depend on the rate performance requirements, on the rate of the ion diffusion into the partially filled particles, and on other parameters.

In an example, the "size" of a nanocomposite particle may be determined in any of a variety of ways. In one example, the size of an individual particle may refer to the diameter of the particle if the particle is spherical or near-spherical. In another example, the size of an individual particle may refer to the diameter of an equivalent volume sphere (e.g., a representative same-volume sized sphere of the particle) of the particle if the particle is non-spherical (e.g., spheroidal, oblong, etc.). If the equivalent volume sphere approach is used, the total pore volume from the particle is retained in the equivalent volume sphere of the particle. In yet another example, for an irregularly shaped particle (e.g., an oblong particle), the size of an individual particle may refer to a smallest dimension of the particle (e.g., width) or a length of the particle (e.g., length). Hence, the various particle size ranges described with respect to embodiments of the disclosure may refer to sizes determined in accordance with any of the above-noted methodologies, based on the shapes and/or other characteristics of the respective particles.

In some designs, it may be advantageous to use irregularly shaped (e.g., non-spherical) (nano)composite electrode particles to create so-called "jammed particle packing" configuration in the electrode, which may minimize shear stresses at particle-particle interfaces during the volume changes and thus enhancing electrode mechanical stability during cycling. In some designs, it may be advantageous to use a mixture of different particle shapes to achieve optimal mechanical stability. In one example, a variety of particle shapes may be achieved by either mechanical milling, adjustment of electrode particle processing, clustering of electrode particles, attachment of rigid structures to the particle surfaces, or using a combination of these and other approaches. Mechanical milling, for example, may involve any number of procedures for particle pulverization and separation, including but not limited to ball milling, rod milling, vertical shaft impact (VSI) milling, jet milling, and planetary milling. Clustering of electrode particles may be achieved prior to casting the electrode using a polymeric binder (in some designs, preferably a "less swellable in electrolyte" binder with relatively high elastic modulus) to create rigid, distinct particle agglomerates. A conductive additive may be incorporated with this polymer to ensure electrical contact within the cluster in some designs.

Clustering of particles may also involve a polymeric carbon precursor that is subsequently carbonized to improve intra-cluster electrical conductivity. Clustering of particles may involve carbon or metal CVD. The size of clusters can be adjusted with mechanical milling and separation as described above.

Rigid structures attached to (nano)composite volume-changing electrode particle surfaces may be comprised of polymeric, metallic, ceramic, or composite materials with 0D (e.g., small nano-particles, such as carbon black or carbon onions or conductive polymer nanoparticles), 1D (e.g., fibers, needles, columns), 2D (e.g., plates, chips, flakes), or 3D (e.g., polyhedra, irregular solid) morphologies. The structures may be electrically conductive themselves (e.g., carbon or metallic structures) and/or may be used together with 1D conductive additives (e.g., CNT's, carbon fibers, metal nanowires) to ensure electrical contact between particles as the particle-particle separation distance increases. These structures may be attached to particle surfaces via CVD or precipitation from a solution. A solution-based method may involve attachment of these structures with a polymeric binder that may or may not be subsequently carbonized to improve adhesion and/or electrical conductivity.

Some aspects of this disclosure may also be applicable to conventional intercalation-type electrodes and provide benefits of improved rate performance or improved stability, particularly for electrodes with medium-high and high capacity loadings (e.g., greater than 3 mAh/cm$^2$).

This description is provided to enable any person skilled in the art to make or use embodiments of the present invention. It will be appreciated, however, that the present invention is not limited to the particular formulations, process stages, and materials disclosed herein, as various modifications to these embodiments will be readily apparent to those skilled in the art. That is, the generic principles defined herein may be applied to other embodiments without departing from the spirit or scope of the invention.

The invention claimed is:

1. A Li-ion battery cell, comprising:
   (i) a cathode electrode, comprising: intercalation-type cathode active material particles, cathode conductive additive particles, a cathode polymer binder, and a cathode current collector;
   (ii) an anode electrode, comprising: silicon (Si)-carbon (C) nanocomposite anode active material particles, anode conductive additive particles, an anode polymer binder, and an anode current collector,
   wherein the Si—C nanocomposite anode active material particles: (a) exhibit an average particle size in a range from about 0.2 microns to about 20 microns, (b) exhibit a volume expansion in a range of about 8 vol. % to about 180 vol. % during one or more charge-discharge cycles of the Li-ion battery cell, (c) exhibit specific capacity in a range from about 500 mAh/g to about 3000 mAh/g, and (d) exhibit Brunauer-Emmett-Teller (BET) specific surface area in a range from about 0.1 m$^2$/g to about 100 m$^2$/g,
   wherein the anode electrode: (e) exhibits an areal capacity loading in a range of about 3 mAh/cm$^2$ to about 12 mAh/cm$^2$, (f) exhibits a volumetric capacity in a range from about 600 mAh/cm$^3$ to 1400 mAh/cm$^3$ in a charged state of the Li-ion battery cell, (g) comprises a polymer binder that is configured to bind the Si—C nanocomposite anode active material particles and the anode conductive additive particles together;
   (iii) a separator interposed between the anode and the cathode; and
   (iv) an electrolyte impregnating the separator.

2. The Li-ion battery cell of claim 1, wherein the electrolyte comprises one or more carbonate solvents, a LiPF$_6$ salt, and at least one additional salt dissolved in the one or more carbonate solvents.

3. The Li-ion battery cell of claim 1, wherein the anode conductive additive particles comprise one-dimensional (1D) particles, selected from: carbon-comprising nanotubes, carbon-comprising nanofibers, carbon-coated metal oxide nanofibers, carbide-comprising nanofibers, and conductive polymer-comprising nanofibers.

4. The Li-ion battery cell of claim 1, wherein the anode conductive additive particles comprise two-dimensional (2D) particles, selected from: (i) metal-comprising nanoflakes, (ii) metal carbide-comprising nanoflakes, (iii) graphene, and (iv) graphite-comprising flakes or graphite-comprising ribbons.

5. The Li-ion battery cell of claim 1, wherein the anode conductive additive particles comprise two or more different conductive particle types.

6. The Li-ion battery cell of claim 5, wherein the two or more different conductive particle types comprise one or more of the following carbon-comprising particle types: (i) single-walled carbon nanotubes (SWCNTs); (ii) double-walled carbon nanotubes (DWCNTs), (iii) a multiwall carbon nanotubes (MWCNTs); (iv) a carbon-comprising fiber; (v) a carbon-coated ceramic fiber; (vi) carbon black; (vii) a graphite ribbon; and (viii) one or more flakes or one or more nanoflakes comprising graphite, carbide, nitride or carbonitride.

7. The Li-ion battery cell of claim 5, wherein at least one conductive particle type of the two or more different conductive particle types exhibits an average length of about 3 to about 100 times larger than an average length of at least one other conductive particle type of the two or more different conductive particle types.

8. The Li-ion battery cell of claim 5, wherein at least one conductive particle type of the two or more different conductive additive particle types exhibits a different surface chemistry or a different surface charge than at least one other conductive particle type of the two or more different conductive additive particle types.

9. The Li-ion battery cell of claim 5, wherein at least one conductive particle type exhibits a higher affinity to the Si—C nanocomposite anode active material particles than at least one other conductive particle type of the two or more different conductive additive particle types.

10. The Li-ion battery cell of claim 1, wherein an overall volume fraction of all of the anode conductive additive particles in the anode electrode is less than about 5 vol. %.

11. Li-ion battery cell of claim 10, wherein the overall volume fraction of all of the anode conductive additive particles in the anode electrode is less than about 2 vol. %.

12. Li-ion battery cell of claim 1, wherein an overall mass fraction of all of the anode conductive additive particles in the anode electrode is less than about 7 wt. %.

13. The Li-ion battery cell of claim 12, wherein the overall mass fraction of all of the anode conductive additive particles in the anode electrode is less than about 3 wt. %.

14. The Li-ion battery cell of claim 1, wherein the anode polymer binder comprises a copolymer.

15. The Li-ion battery cell of claim 1, wherein the anode polymer binder exhibits a maximum elongation in excess of about 10%.

16. The Li-ion battery cell of claim 1, wherein an elastic modulus of the anode polymer binder is reduced by less than about 5 times in the electrolyte.

17. The Li-ion battery cell of claim 16, wherein the elastic modulus of the anode polymer binder is reduced by less than about 2 times in the electrolyte.

18. The Li-ion battery cell of claim 17, wherein the elastic modulus of the anode polymer binder is reduced by less than about 20% in the electrolyte.

19. The Li-ion battery cell of claim 1, wherein the anode polymer binder comprises at least one of the following components: (i) vinyl acrylic or butyl acrylic or methyl acrylic or propyl acrylic, (ii) vinyl acetate-acrylic or butyl acetate-acrylic or methyl acetate-acrylic or propyl acetate-acrylic, (iii) vinyl acrylate or butyl acrylate or methyl acrylate or propyl acrylate, (iv) styrene-acrylic, (v) alginic acid or a metal salt of alginic acid, (vi) acrylic acid or a metal salt of acrylic acid, (vii) carboxylic acid or a metal salt of carboxylic acid, (viii) sterene, (ix) acrylamide, or (x) any combination thereof.

20. The Li-ion battery cell of claim 1, wherein the anode polymer binder is a water-soluble copolymer, which comprises a poly(acrylamide) and at least one of the following components: (i) acrylic acid, (ii) Na salt of acrylic acid, (iii) K salt of acrylic acid, (iv) Li salt of acrylic acid, (v) alginic acid, (vi) Na salt of alginic acid, (vii) K salt of alginic acid, (viii) Li salt of alginic acid, (ix) carboxylic acid, (x) Na salt of carboxylic acid, (xi) K salt of carboxylic acid, (xii) Li salt of carboxylic acid, or (xiii) any combination thereof.

21. The Li-ion battery cell of claim 20, wherein the anode polymer binder comprises the (i) acrylic acid, or the (ii) Na salt of acrylic acid, or the (iii) K salt of acrylic acid.

22. The Li-ion battery cell of claim 1, wherein the anode polymer binder comprises polymer nanofibers.

23. The Li-ion battery cell of claim 22, wherein the polymer nanofibers comprise a fluoropolymer.

24. The Li-ion battery cell of claim 23, wherein the fluoropolymer comprises one or more of the following: (i) polytetrafluoroethylene (PTFE), polyperfluoroprophylene, polyperfluoroalkene, a copolymer comprising the polyperfluoroalkene, or a combination thereof, (ii) perfluoroalkoxy, (iii) fluorinated ethylene propylene, (iv) an amorphous fluoroplastic (AF) polymer, or (v) any combination thereof.

25. The Li-ion battery cell of claim 23, wherein the fluoropolymer comprises one or more functional groups that form either chemical bonds or strong hydrogen bonds with the Si—C nanocomposite anode active material particles in the anode electrode.

26. The Li-ion battery cell of claim 23,
wherein the anode electrode comprises an electrically conductive interlayer between the anode current collector and an active material electrode layer,
wherein the electrically conductive interlayer comprises a polymer binder and conductive carbon particles.

27. The Li-ion battery cell of claim 26, wherein a thickness of the electrically conductive interlayer is in a range from about 50 nm to about 1 micron.

28. The Li-ion battery cell of claim 1, wherein the anode current collector comprises a copper (Cu)-comprising foil and exhibits an average thickness in a range from about 4 micron to about 15 micron.

29. The Li-ion battery cell of claim 28, wherein the Cu-comprising foil comprises a Cu alloy comprising one or more of the following metals: Ni, Fe, Ti, Mg.

30. The Li-ion battery cell of claim 1, wherein the intercalation-type cathode active material particles comprise two or more of the following metals: lithium (Li), nickel (Ni), cobalt (Co), aluminum (Al).

31. The Li-ion battery cell of claim 30, wherein the intercalation-type cathode active material particles comprises one or more of the following classes: lithium cobalt oxide (LCO), lithium nickel cobalt manganese oxide (NCM), lithium nickel cobalt aluminum oxide (NCA), lithium manganese oxide (LMO).

32. The Li-ion battery cell of claim 1, wherein the polymer binder is configured to stabilize the anode electrode against degradation accompanied by the volume expansion during the one or more charge-discharge cycles of the Li-ion battery cell while maintaining an electrical connection between the anode current collector and the Si—C nanocomposite anode active material particles.

\* \* \* \* \*